US012143768B2

(12) United States Patent
Son et al.

(10) Patent No.: US 12,143,768 B2
(45) Date of Patent: *Nov. 12, 2024

(54) DISPLAY DEVICE WITH INTEGRATED SOUND GENERATORS

(71) Applicant: SAMSUNG DISPLAY CO., LTD., Yongin-si (KR)

(72) Inventors: Young Ran Son, Seoul (KR); Jin Oh Kwag, Suwon-si (KR); Jee Hyun Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,060

(22) Filed: Jun. 27, 2023

(65) Prior Publication Data

US 2023/0345173 A1 Oct. 26, 2023

Related U.S. Application Data

(63) Continuation of application No. 17/472,240, filed on Sep. 10, 2021, now Pat. No. 11,729,547, which is a (Continued)

(30) Foreign Application Priority Data

Sep. 28, 2018 (KR) ........................ 10-2018-0116147

(51) Int. Cl.
*H04R 1/40* (2006.01)
*H04R 1/02* (2006.01)
(Continued)

(52) U.S. Cl.
CPC ............. *H04R 1/403* (2013.01); *H04R 1/025* (2013.01); *H04R 1/22* (2013.01); *H04S 7/303* (2013.01); *H04R 2499/15* (2013.01)

(58) Field of Classification Search
CPC .......... H04R 1/403; H04R 1/025; H04R 1/22; H04R 2499/15; H04S 7/303
See application file for complete search history.

(56) References Cited

U.S. PATENT DOCUMENTS 8,879,766 B1 11/2014 Zhang
9,036,842 B2 5/2015 Kim et al.
(Continued)

FOREIGN PATENT DOCUMENTS

CN 104238990 A 12/2014
CN 105096778 A 11/2015
(Continued)

OTHER PUBLICATIONS

Korean Office Action dated Apr. 28, 2023 in corresponding Korean Application No. 10-2018-0116147, in Korean, (7 pages).
(Continued)

*Primary Examiner* — David L Ton
(74) *Attorney, Agent, or Firm* — F. CHAU & ASSOCIATES, LLC

(57) ABSTRACT

Provided are display devices and methods of driving the same. A display device may include: a display panel, a main sound generator and a sub-sound generator disposed on a surface of the display panel. The main sound generator outputs sound in a first directional mode, and each of the main sound generator and the sub-sound generator outputs sound in a second directional mode. Each directional mode may be a mode in which sound is directed towards a particular viewer's location.

22 Claims, 34 Drawing Sheets

Related U.S. Application Data continuation of application No. 16/585,737, filed on Sep. 27, 2019, now Pat. No. 11,122,361.

(51) Int. Cl.

| | |
|---|---|
| ***H04R 1/22*** | (2006.01) |
| ***H04S 7/00*** | (2006.01) |

(56) References Cited

U.S. PATENT DOCUMENTS

| | | | |
|---|---|---|---|
| 9,843,881 | B1 | 12/2017 | Oates, III et al. |
| 11,122,361 | B2 | 9/2021 | Son et al. |
| 2010/0226499 | A1 | 9/2010 | De Bruijn et al. |
| 2015/0341714 | A1 | 11/2015 | Ahn et al. |
| 2018/0060025 | A1 | 3/2018 | Hill et al. |
| 2019/0182926 | A1 | 6/2019 | Engelen et al. |
| 2019/0208300 | A1 | 7/2019 | Lee et al. |
| 2020/0100024 | A1 | 3/2020 | Choi et al. |
| 2020/0107115 | A1 | 4/2020 | Son et al. |
| 2020/0196082 | A1 | 6/2020 | Heilemann et al. |
| 2021/0409863 | A1 | 12/2021 | Son et al. |

FOREIGN PATENT DOCUMENTS

| | | | |
|---|---|---|---|
| EP | 3330780 | A1 | 6/2018 |
| JP | 2001-025084 | | 1/2004 |
| JP | 2008-154689 | | 7/2008 |
| KR | 20-1998-0062780 | | 11/1998 |
| KR | 10-2005-0044881 | | 5/2005 |
| KR | 10-2007-0118414 | | 12/2007 |
| KR | 10-2011-0067381 | | 6/2011 |
| KR | 10-1298487 | | 8/2013 |
| KR | 10-1473582 | | 12/2014 |
| KR | 10-1564288 | | 10/2015 |
| KR | 10-1684141 | | 12/2016 |
| KR | 10-2018-0003372 | | 1/2018 |
| KR | 10-2018-0062320 | | 6/2018 |

OTHER PUBLICATIONS

Korean Office Action dated Oct. 12, 2022 in corresponding Korean Application No. 10-2018-0116147, in Korean, 4 pages.

Chinese Office Action dated Mar. 7, 2024 in corresponding Chinese Patent Application No. 201910906697.1, in Chinese (7 pages).

Chinese Office Action dated Jul. 16, 2024 in corresponding Chinese Patent Application No. 201910906697.1 (10 pages), in Chinese.

DISPLAY DEVICE WITH INTEGRATED SOUND GENERATORS

CROSS REFERENCE TO RELATED APPLICATIONS

This application is a continuation of U.S. patent application Ser. No. 17/472,240, filed Sep. 10, 2021 in the U.S. Patent and Trademark Office, which is a continuation of U.S. patent application Ser. No. 16/585,737, filed Sep. 27, 2019 in the U.S. Patent and Trademark Office, which claims the benefit of Korean Patent Application No. 10-2018-0116147, filed on Sep. 28, 2018, in the Korean Intellectual Property Office, the disclosures of which are incorporated herein by reference in their entireties.

TECHNICAL FIELD

The present disclosure relates generally to display devices with integrated sound generators, and to methods of driving the same.

DISCUSSION OF RELATED ART

A display device such as a television or computer monitor may include a display panel for displaying an image and an integrated sound system comprising one or more sound generators for providing sound. Traditionally, the sound generators are speakers mounted outside the perimeter of the display panel. Recently, display devices have been proposed with sound generators mounted to the rear surface of the display panel, thereby reducing the footprint of the overall display device. Such rear mounted sound generators vibrate the display panel itself to generate sound waves that propagate outward from the display panel towards the user.

SUMMARY

Aspects of the present disclosure provide a display device capable of outputting sound in a particular direction.

Aspects of the present disclosure also provide a method of driving a display device capable of outputting sound in a particular direction.

According to an aspect of the present disclosure, there is provided a display device including: a display panel; and a main sound generator and a sub-sound generator disposed on a surface of the display panel. The main sound generator outputs sound in a first directional mode, and each of the main sound generator and the sub-sound generator outputs sound in a second directional mode.

In Various Embodiments

The sub-sound generator may be a first sub-sound generator, and the display device may further include a second sub-sound generator disposed on the surface of the display panel, where the main sound generator and the second sub-sound generator output sound in a third directional mode.

The main sound generator may be disposed closer to a center of the display panel than the first sub-sound generator and the second sub-sound generator.

The first sub-sound generator may be disposed closer to a first side of the display panel than the main sound generator, and the second sub-sound generator may be disposed closer to a second side of the display panel than the first main sound generator.

The first side and the second side of the display panel may be on opposite sides of the display panel.

The display device may further include a third sub-sound generator and a fourth sub-sound generator disposed on the surface of the display panel, wherein the first main sound generator and the third sub-sound generator output sound in a fourth directional mode, and the main sound generator and the fourth sub-sound generator output sound in a fifth directional mode.

The main sound generator, the first sub-sound generator, the second sub-sound generator, the third sub-sound generator, and the fourth sub-sound generator may collectively output sound in a non-directional mode.

The main sound generator may be disposed closer to the center of the display panel than each of the third sub-sound generator and the fourth sub-sound generator.

The third sub-sound generator may be disposed closer to a third side of the display panel than the first main sound generator, and the fourth sub-sound generator may be disposed closer to a fourth side of the display panel than the first main sound generator.

The third side and the fourth side of the display panel may be on opposite sides of the display panel.

The main sound generator may be a first main sound generator, and the display device may further include a second main sound generator disposed on the surface of the display panel, wherein a distance between the first main sound generator and the second main sound generator is smaller than a distance between the first main sound generator and the first sub-sound generator, a distance between the first main sound generator and the second sub-sound generator, a distance between the second main sound generator and the first sub-sound generator, and a distance between the second main sound generator and the second sub-sound generator.

The size of the first main sound generator may be larger than the size of each of the first sub-sound generator and the second sub-sound generator.

Sound output by the first main sound generator may have a fundamental frequency (F0) higher than that of sound output by the first sub-sound generator and that of sound output by the second sub-sound generator.

A sound pressure level of the first main sound generator is higher than those of the first sub-sound generator and the second sub-sound generator in a high-frequency region, and the sound pressure levels of the first sub-sound generator and the second sub-sound generator are higher than that of the first main sound generator in a lower-frequency region lower than the high-frequency region.

The second sub-sound generator outputs a sound wave with an opposite phase to the sound of the first main sound generator in the second directional mode, and the first sub-sound generator outputs a sound wave with an opposite phase to the sound of the first main sound generator in the third directional mode.

The display device further comprising an under-panel member which comprises a buffer member disposed under the display panel and a heat dissipating member disposed under the buffer member, wherein the first main sound generator, the first sub-sound generator, and the second sub-sound generator are disposed under the buffer member and do not overlap the heat dissipating member.

The display panel comprises a first main vibration area in which the first main sound generator is disposed, a first sub-vibration area in which the first sub-sound generator is disposed, a second sub-vibration area in which the second sub-sound generator is disposed, and a propagation blocking area which is disposed between the first main vibration area and the first sub-vibration area and between the first main vibration area and the second sub-vibration area.

The display device further comprising an under-panel member which comprises a buffer member disposed under the display panel and a heat dissipating member disposed under the buffer member, wherein the buffer member and the heat dissipating member are excluded from the propagation blocking area.

The display panel comprises a lower substrate, a thin-film transistor layer disposed on the lower substrate, a light emitting element layer disposed on the thin-film transistor layer and a thin-film encapsulation layer disposed on the light emitting element layer, and the lower substrate is excluded from the propagation blocking area.

The thin-film transistor layer, the light emitting element layer, and the thin-film encapsulation layer are excluded from the propagation blocking area.

The thin-film encapsulation layer covers side surfaces of the thin-film transistor layer and upper and side surfaces of the light emitting element layer in the first main vibration area, the first sub-vibration area, and the second sub-vibration area.

The display device further comprising an under-panel member which comprises a buffer member disposed under the display panel and a heat dissipating member disposed under the buffer member, wherein the buffer member comprises a plurality of concave grooves formed in a surface of the buffer member in the propagation blocking area.

The display device further comprising a low-density material which fills the grooves and has a density lower than that of the buffer member.

The display device further comprising a metal layer which fills at least a part of each of the grooves.

The display device further comprising a first flexible circuit board which connects the metal layer and the first main sound generator.

The display device further comprising a protective layer which is disposed on the metal layer filling each of the grooves.

Each of the first main sound generator, the first sub-sound generator, and the second sub-sound generator comprises: a first electrode to which a first driving voltage is applied; a second electrode to which a second driving voltage is applied; and a vibration layer which is disposed between the first electrode and the second electrode and contracts or expands according to the first driving voltage applied to the first electrode and the second driving voltage applied to the second electrode.

The display device further comprising a first flexible circuit board which is electrically connected to the first electrode and the second electrode of the first main sound generator.

The display panel comprises: a substrate; a flexible film which is attached to a side of the substrate; and a control circuit board which is electrically connected to the flexible film, wherein the first flexible circuit board is connected to a connector disposed on the control circuit board.

According to another aspect of the present disclosure, there is provided a method of driving a display device, the method comprising: capturing an image of an area in front of a display device by using a camera sensor; executing, by processing circuitry, operations comprising: determining the position of a user by analyzing the image captured by the camera sensor; controlling a main sound generator disposed adjacent to a center of the display device to output sound when the user is located in front of the center of the display device; controlling the main sound generator and a first sub-sound generator, which is disposed closer to a first side of the display device than the main sound generator, to output sound when the user is located in front of the first side of the display device; and controlling the main sound generator and a second sub-sound generator, which is disposed closer to a second side of the display device than the main sound generator, to output sound when the user is located in front of the second side of the display device.

In another aspect, a display device includes: a display panel; plural sound generators, laterally spaced from one another across a rear surface of the display panel and each vibrationally coupled to the rear surface of the display panel to thereby produce sound waves propagating outward from a front surface of the display panel; and control circuitry. The control circuitry is configured to activate selected ones of the sound generators to produce: (i) in a first directional mode, first sound that reaches a first location at a sound level higher than that reaching a second location; and (ii) in a second directional mode, second sound that reaches the second location at a higher sound level than that reaching the first location.

BRIEF DESCRIPTION OF THE DRAWINGS

These and/or other aspects will become apparent and more readily appreciated from the following description of embodiments, taken in conjunction with the accompanying drawings in which like reference characters denote like elements or features, wherein.

DETAILED DESCRIPTION

Illustrative embodiments of the inventive concept will now be described more fully hereinafter with reference to the accompanying drawings. The inventive concept may, however, be embodied in different forms and should not be construed as limited to the embodiments set forth herein.

In the attached figures, the thickness of layers and regions may be exaggerated for clarity. It will also be understood that when a layer is referred to as being "on" another layer, surface or substrate, it can be directly on the other layer, surface or substrate, or intervening layers may also be present. In contrast, when an element is referred to as being "directly on" another element, there are no intervening elements present.

Figure 1:
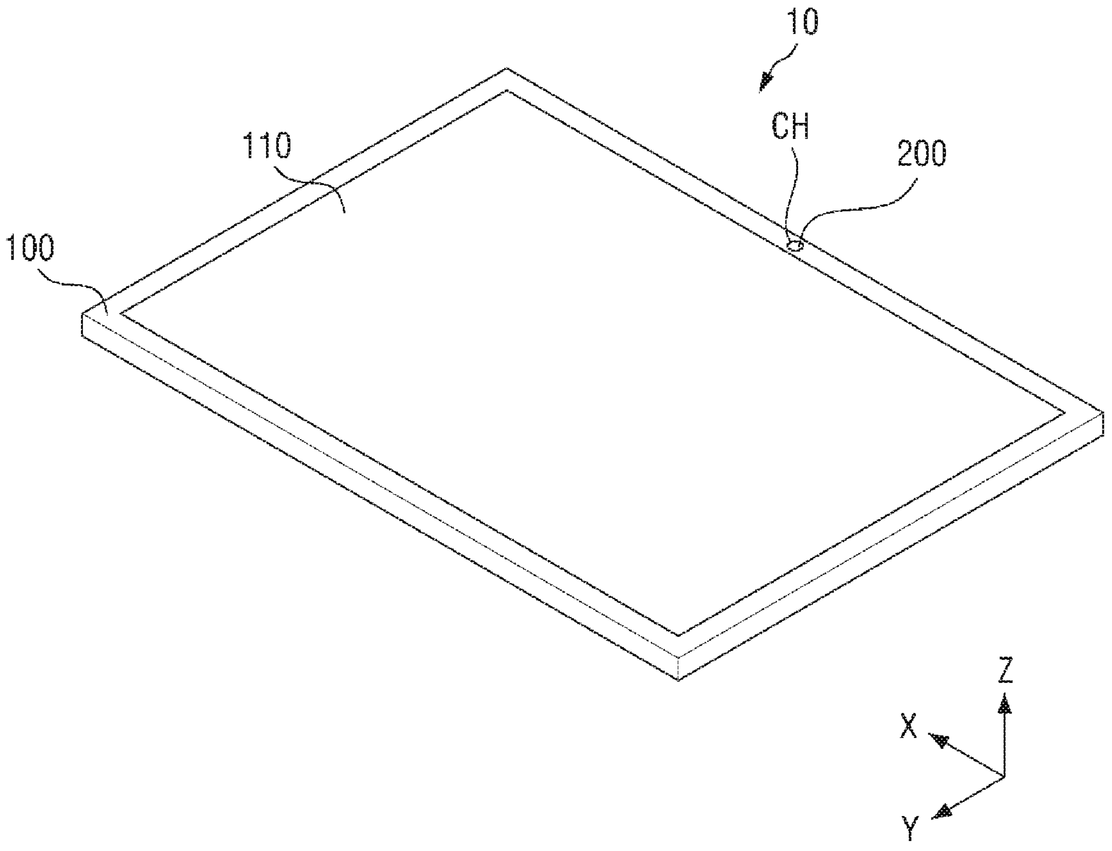
FIG. 1 is a perspective view of a display device according to an embodiment.
Figure 2:
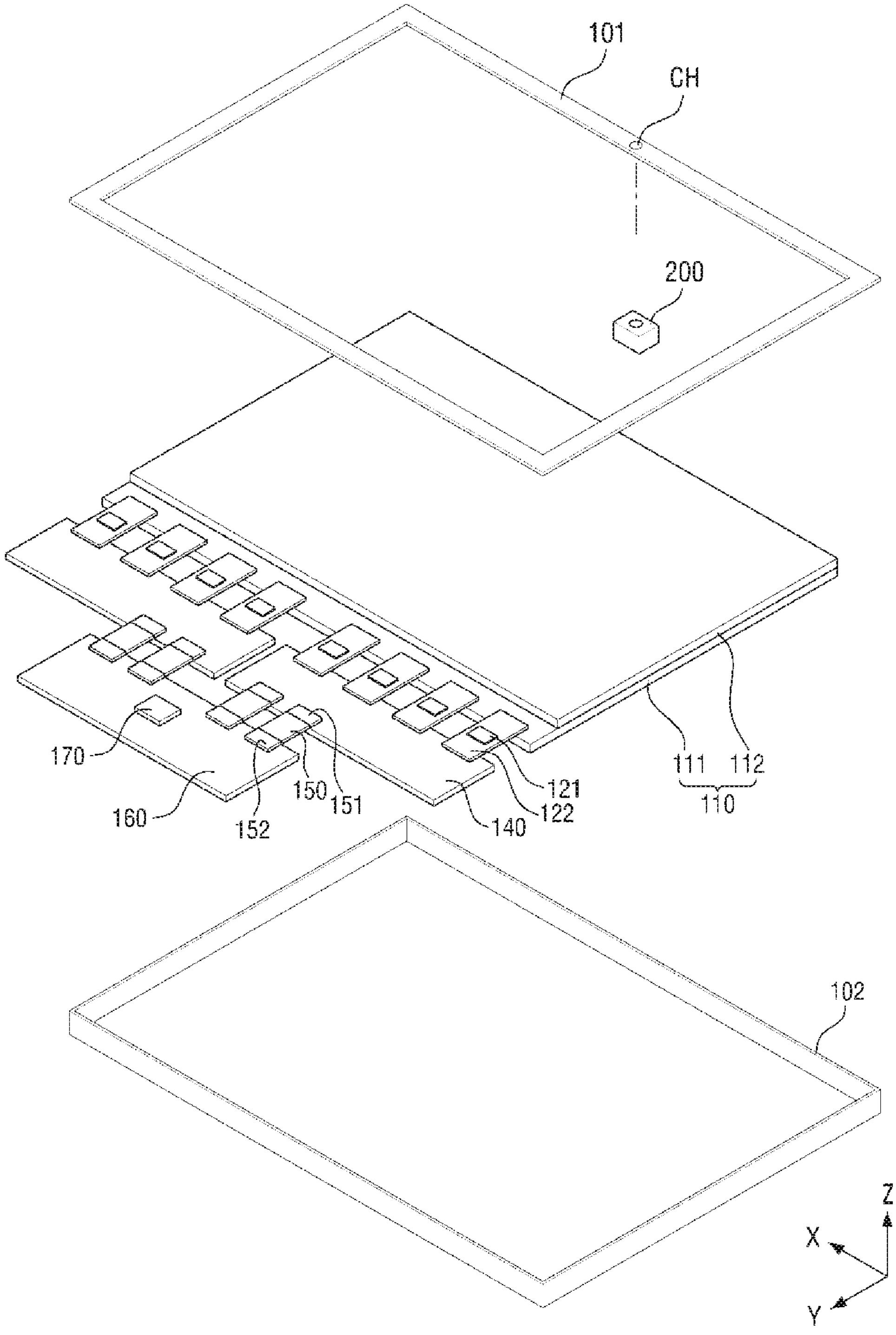
FIG. 2 is an exploded perspective view of the display device of FIG. 1.
Figure 3:
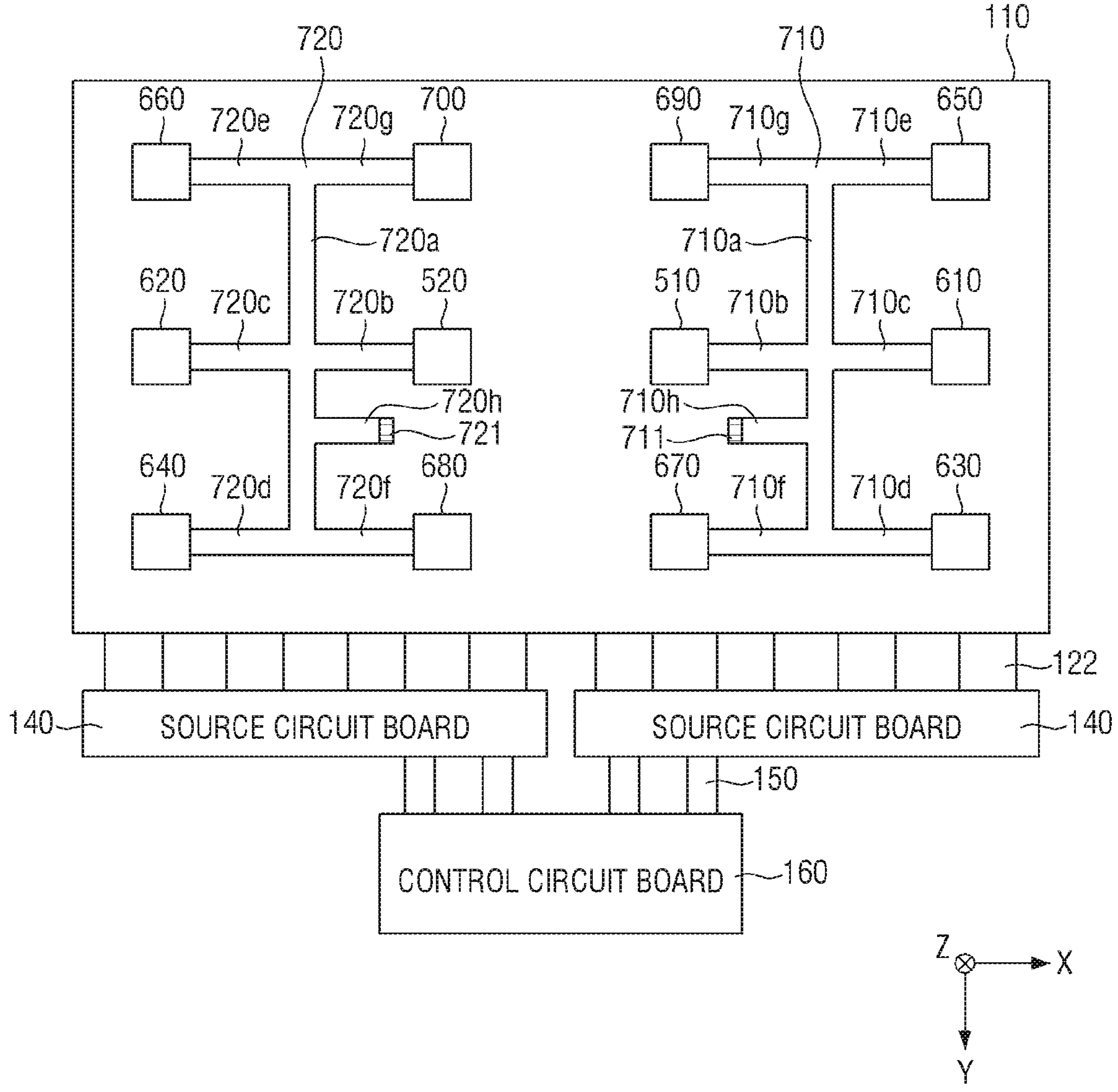
FIG. 3 is a bottom view illustrating an example of a display panel when flexible films illustrated in FIG. 2 are not bent.
Figure 4:
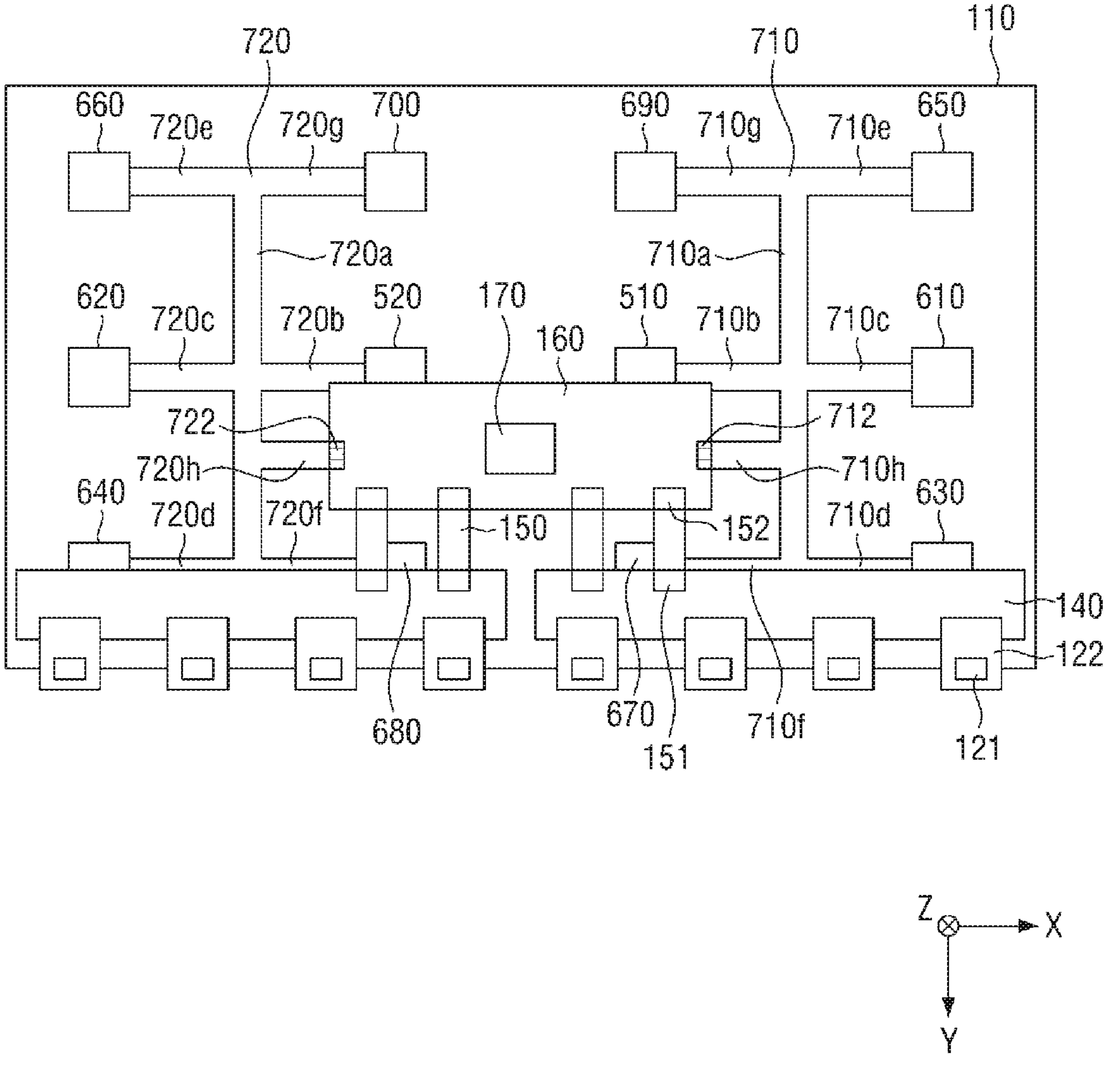
FIG. 4 is a bottom view illustrating the example of the display panel when the flexible films illustrated in FIG. 2 are bent.

FIG. 1 is a perspective view of a display device 10 according to an embodiment. FIG. 2 is an exploded perspective view of the display device 10 of FIG. 1. FIG. 3 is a bottom view illustrating an example of a display panel 110 when flexible films 122 illustrated in FIG. 2 are not bent. FIG. 4 is a bottom view illustrating the example of the display panel 110 when the flexible films 122 illustrated in FIG. 2 are bent. Since FIGS. 3 and 4 are bottom views, it should be noted that left and right sides of the display device 10 in FIGS. 3 and 4 are opposite to those of the display device 10 in FIGS. 1 and 2.

The display device 10 according to the embodiment may be, but is not limited to, an organic light emitting display using organic light emitting elements as light emitting elements or a micro-light emitting display (inorganic light emitting display) using micro-light emitting diodes (inorganic light emitting diodes) as light emitting elements. An example of an organic light emitting display will be mainly described below.

Referring to FIGS. 1 through 4, the example display device 10 includes a cover frame 100, the display panel 110, source driving circuits 121, the flexible films 122, a source circuit board 140, flexible cables 150, a control circuit board 160, a timing control circuit 170, and a camera sensor 200.

In the following discussion, the terms "on", "top" and "upper surface" indicate a relative position in which an upper substrate 112 is disposed with respect to a lower substrate 111 of the display panel 110, that is, in a positive Z-axis direction. Likewise, the terms "under," "bottom" and "lower surface" indicate a position in which the lower substrate 111 is disposed with respect to the upper substrate 112 of the display panel 110, that is, in a negative Z-axis direction. The top surface of the display panel 110 may also be referred to as the front surface, i.e., coinciding with a front side of the display device 10, in which an image is output to a viewer ("user"). The lower surface of display panel 110 may also be referred to as the rear surface of the display panel. In addition, "left," "right," "upper" and "lower" indicate directions when the display panel 110 is viewed from the front side in a plane. For example, "left" indicates a positive X-axis direction, "right" indicates a negative X-axis direction, "upper" indicates a positive Y-axis direction, and "lower" indicates a negative Y-axis direction.

The cover frame 100 may be disposed surrounding edges of the display panel 110. For example, the cover frame 100 may be disposed to cover edges of front, rear and side surfaces of the display panel 110 as illustrated in FIGS. 1 and 2. The cover frame 100 may cover a non-display area, which is outside a display area of the display panel 110. The cover frame 100 may include plastic, metal, or plastic and metal.

The cover frame 100 may include an upper frame 101 and a lower frame 102 as illustrated in FIG. 2. A camera hole CH exposing the camera sensor 200 may be formed in an upper surface of the upper frame 101. In FIG. 2, the camera hole CH is formed on an upper side of the upper frame 101. However, the present disclosure is not limited to this case. For example, the camera hole CH may also be formed on a left side, a right side, or a lower side of the upper frame 101.

The display device 110 may be generally rectangular in a plan view. For example, the display panel 110 may have a rectangular planar shape having short sides in a first direction (X-axis direction) and long sides in a second direction (Y-axis direction) as illustrated in FIG. 2. Each corner where a long side extending in the X-axis direction meets a short side extending in the Y-axis direction may be right-angled or may be rounded with a predetermined curvature. The planar shape of the display panel 110 is not limited to the rectangular shape, but may alternatively be another polygonal shape, a circular shape, or an elliptical shape.

In FIG. 2, the display panel 110 is formed flat. However, in other embodiments, the display panel 110 may be bent with a predetermined curvature.

The display panel 110 may include the lower substrate 111 and the upper substrate 112. The lower substrate 111 and the upper substrate 112 may be rigid or flexible. The lower substrate 111 may be made of glass or plastic, and the upper substrate 112 may be made of glass, plastic, an encapsulation film, or a barrier film. The plastic may be polyethersulphone (PES), polyacrylate (PA), polyarylate (PAR), polyetherimide (PEI), polyethylene naphthalate (PEN), polyethylene terepthalate (PET), polyphenylene sulfide (PPS), polyallylate, polyimide (PI), polycarbonate (PC), cellulose triacetate (CAT), cellulose acetate propionate (CAP), or a combination of these materials. The encapsulation film or the barrier film may be a metal encapsulation film or a film in which a plurality of inorganic layers are stacked.

The display panel 110 may further include a thin-film transistor layer, a light emitting element layer, and a thin-film encapsulation layer disposed between the lower substrate 111 and the upper substrate 112. The thin-film transistor layer, the light emitting element layer and the thin-film encapsulation layer of the display panel 110 will be described in detail later with reference to FIG. 25.

Since the lower substrate 111 is larger in size than the upper substrate 112, a side of the lower substrate 111 may be exposed without being covered by the upper substrate 112. The flexible films 122 may be attached to the exposed side of the lower substrate 111 which is not covered by the upper substrate 112. Each of the flexible films 122 may be a tape carrier package or a chip on film. Each of the flexible films 122 may be attached onto the lower substrate 111 by tape automated bonding (TAB) using an anisotropic conductive film. Accordingly, the source driving circuits 121 may be connected to data lines.

Each of the flexible films 122 is bendable. Therefore, the flexible films 122 can be bent toward a rear surface of the lower substrate 111 as illustrated in FIG. 4. In this case, the source circuit board 140, the flexible cables 150, and the control circuit board 160 may be disposed on the rear surface of the lower substrate 111.

Although eight flexible films 122 are attached onto the lower substrate 111 of the display panel 110 in FIG. 2, more or fewer flexible films 122 may be utilized in other embodiments.

The source driving circuits 121 may be mounted on respective surfaces of the flexible films 122, respectively. The source driving circuits 121 may be formed as integrated circuits. The source driving circuits 121 convert digital video data into analog data voltages according to a source control signal of the timing control circuit 170 and supply the analog data voltages to the data lines of the display panel 110 through the flexible films 122.

A side of each of the flexible films 122 may be attached onto a surface of the lower substrate 111 of the display panel 110, and the other side of each of the flexible films 122 may be attached onto a surface of the source circuit board 140. The source circuit board 140 may be connected to the control circuit board 160 via the flexible cables 150. To this end, the source circuit board 140 may include first connectors 151 for connection to the flexible cables 150. The source circuit board 140 may be a flexible printed circuit board or a printed circuit board.

The control circuit board 160 may be connected to the source circuit board 140 via the flexible cables 150. To this end, the control circuit board 160 may include second connectors 152 for connection to the flexible cables 150. The control circuit board 160 may be a flexible printed circuit board or a printed circuit board. More or fewer than the four flexible cables 150 shown in FIG. 2 may be utilized in other designs.

The timing control circuit 170 may be mounted on a surface of the control circuit board 160. The timing control circuit 170 may be formed as an integrated circuit. The timing control circuit 170 may receive digital video data and timing signals from a system on chip (discussed later) and generate a source control signal for controlling the timings of the source driving circuits 121 according to the timing signals.

The system on chip may be mounted on a system circuit board that is connected to the control circuit board 160 via another flexible cable and may be formed as an integrated circuit.

The system on chip may be a processor of a smart TV, a central processing unit (CPU) or graphics card of a computer or notebook, or an application processor of a smartphone or tablet PC.

A power supply circuit may be additionally mounted on the surface of the control circuit board 160. The power supply circuit may generate voltages necessary for driving the display panel 110 from main power received from the system circuit board and supply the generated voltages to the display panel 110. For example, the power supply circuit may generate from the main power a high-potential voltage, a low-potential voltage and an initialization voltage for driving organic light emitting elements and supply the generated voltages to the display panel 110. In addition, the power supply circuit may generate driving voltages for driving the source driving circuits 121, the timing control circuit 170, etc. from the main power and supply the generated voltages. The power supply circuit may be formed as an integrated circuit.

The camera sensor 200 may be disposed in the camera hole CH of the cover frame 100. Thus, the camera sensor 200 can photograph an area in front of the display device 10. The camera sensor 200 may be a complementary metal oxide semiconductor (CMOS) image sensor or a charge coupled device (CCD) image sensor.

The camera sensor 200 may be electrically connected to the system on chip mounted on the system circuit board. The camera sensor 200 may output a captured image to the system on chip, and the system on chip may analyze the image captured by the camera sensor 200 to determine a location of a viewer (user) relative to the display device 10. For instance, a user's location may be categorized as being in front of a center, a first side, a second side, a third side or a fourth side of the display device 10. The system on chip may cause maximum sound to be output toward the user's position, by selectively controlling the sound output of a plurality of sound generators according to the user's position.

As illustrated in FIGS. 3 and 4, a plurality of sound generators 510, 520, 610, 620, 630, 640, 650, 660, 670, 680, 690 and 700 (hereafter, sound generators 510-520, 610-700 or just "sound generators" for brevity) may be disposed on the lower (rear) surface of the display panel 110. The sound generators, which may be spaced apart from each other and distributed across the rear surface, may be vibration generators capable of generating vibrations up and down (in the Z direction). Each of the sound generators may vibrate the display panel 110 up and down, thereby outputting sound waves propagating outward from the front surface of display panel 110. Thus, the sound generators may be said to be vibrationally coupled to the display panel 110 to cause the display panel to produce sound. The sound generators may be implemented as eccentric rotating mass (ERM) motors, linear resonant actuators (LRAs), piezo actuators, or the like. A case where the sound generators are piezo actuators will be mainly described below as an example.

The sound generators 510-520 are disposed at a central region of the display panel 110, whereas sound generators 610-700 are arranged at peripheral locations of the display panel 110. In the following example, sound generators 510 and 520 may be called first and second main sound generators, respectively, and sound generators 610-700 may be called first through tenth sub-sound generators. As explained in detail hereafter, display device 10 includes processing circuitry (e.g., within the system on chip) that may activate selected ones of the sound generators 510-520 and 610-700 to output sound that arrives at a user's location at a higher sound level than that which arrives at other locations (equidistant from the display panel 110) where users are not present. To this end, the processing circuitry may determine and set a particular "directional mode" for outputting sound, which may be understood as a mode for outputting sound in a path biased in a direction towards a user's position.

For instance, a "third directional mode" may be a "right side directional mode" designed to direct sound energy towards a user located in front of a right side of the display panel 110. Suppose the user is located at the right side at a Z axis distance "d" from the display panel 110 and the third directional mode is activated. In this case, the level of sound reaching the user may be higher than that reaching a left side location at the Z axis distance d from the display panel 110 (where no user is detected). Accordingly, the technique according to the inventive concept may provide a desired level of sound to the user while reducing unwanted sound energy at other locations (e.g. where persons disinterested in receiving sound may be located). In other words, as compared to a "non-directional" case in which all of the sound generators are activated and driven equally with the same sound signal and signal level, the activation of a directional mode may reduce the overall amount of sound energy output, but still provide the user with a desired level of sound due to the biasing.

The biasing of the sound energy in the above and other examples of directional modes herein may be achieved by activating a subset of the sound generators located at one side of the display panel 110 while concurrently deactivating a subset of sound generators located at one or more other sides of the display panel 110. Accordingly, a particular "directional mode" may be understood as a "sound source location" mode, since it is the general location of the sound source that may be effectively selected in each of the directional modes. In the examples described hereafter, the centrally disposed sound generators 510-520 are activated in all directional modes (as well as in a non-directional mode) and are therefore referred to as main signal generators. The peripherally disposed sound generators 610-700 are selectively activated in the directional modes and are therefore referred to as sub-sound generators. At least one of the sub-sound generators 610-700 may be activated in any given directional mode while another one or more of the sub-sound generators 610-700 may be deactivated in that directional mode.

Note that in the example of FIGS. 3 and 4, two main sound generators 510-520 and ten sub-sound generators 610-700 are provided. In other embodiments, the number of main sound generators and/or the number of sub-sound generators may differ. Further, the main sound generators 510-520 may be of the same design configuration (e.g., size and frequency response characteristics) as the sub-sound generators 610-700 in some embodiments. In other embodiments, the main sound generators 510-520 may be larger than the sub-sound generators 610-700 and/or may have different frequency response characteristics.

As noted, the sound generators 510 and 520 may output sound in all operating modes, i.e., irrespective of the sound directional mode. For instance, the first and second main sound generators 510 and 520 may output sound in a first directional mode for outputting sound forward from the center of the display panel 110, a second directional mode for outputting sound forward from the first side of the display panel 110, a third directional mode for outputting sound forward from the second side of the display panel 110, a fourth directional mode for outputting sound forward from the third side of the display panel 110, a fifth directional mode for outputting sound forward from the fourth side of the display panel 110, and a non-directional mode in which all of the sound generators are activated. Here, the first side of the display panel 110 may be a left side, the second side may be a right side, the third side may be a lower side, and the fourth side may be an upper side. On the other hand, a determination of which, if any, ones of the first through tenth sub-sound generators 610 through 700 will output sound may be made according to the sound directional mode. Whether/which ones of the first through tenth sub-sound generators 610 through 700 will output sound in each of the first directional mode, the second directional mode, the third directional mode, the fourth directional mode, the fifth directional mode, and the non-directional mode will be described in detail later with reference to FIGS. 13A through 13E.

Each of generators 510-520 may be located closer to the center of the display panel 110 than generators 610-700. Generator 510 may be disposed closer to the first side of the display panel 110 than generator 520, and generator 520 may be disposed closer to the second side of the display panel 110 than generator 510.

The first sub-sound generator 610, the third sub-sound generator 630, and the fifth sub-sound generator 650 may be disposed close to the first side of the display panel 110. For example, as illustrated in FIG. 3, the first sub-sound generator 610 may be disposed at the left center of the display panel 110, the third sub-sound generator 630 may be disposed on a lower left side of the display panel 110, and the fifth sub-sound generator 650 may be disposed on an upper left side of the display panel 110.

The second sub-sound generator 620, the fourth sub-sound generator 640, and the sixth sub-sound generator 660 may be disposed close to the second side of the display panel 110. For example, as illustrated in FIG. 3, the second sub-sound generator 620 may be disposed at the right center of the display panel 110, the fourth sub-sound generator 640 may be disposed on a lower right side of the display panel 110, and the sixth sub-sound generator 660 may be disposed on an upper right side of the display panel 110.

The seventh sub-sound generator 670 may be disposed closer to the third side of the display panel 110 than the first main sound generator 510, and the eighth sub-sound generator 680 may be disposed closer to the third side of the display panel 110 than the second main sound generator 520. The ninth sub-sound generator 690 may be disposed closer to the fourth side of the display panel 110 than the first main sound generator 510, and the tenth sub-sound generator 700 may be disposed closer to the fourth side of the display panel 110 than the second main sound generator 520.

Each of sound generators 510-520, 610-700 may be connected to the control circuit board 160 by a flexible circuit board. For example, the first main sound generator 510, the first sub-sound generator 610, the third sub-sound generator 630, the fifth sub-sound generator 650, the seventh sub-sound generator 670 and the ninth sub-sound generator 690 may be connected to a first flexible circuit board 710, and a first connection portion 711 of the first flexible circuit board 710 may be connected to a third connector 712 of the control circuit board 160 placed on the lower surface of the display panel 110 when the flexible films 122 are bent toward the lower surface of the display panel 110 as illustrated in FIG. 4.

For example, the first flexible circuit board 710 may include a first stem portion 710*a* and first through seventh branch portions 710*b* through 710*h* branching from the first stem portion 710*a*. The first branch portion 710*b* may branch from the first stem portion 710*a* toward the second side and may be connected to the first main sound generator 510. The second branch portion 710*c* may branch from the first stem portion 710*a* toward the first side and may be connected to the first sub-sound generator 610. The third branch portion 710*d* may branch from the first stem portion 710*a* toward the first side and may be connected to the third sub-sound generator 630. The fourth branch portion 710*e* may branch from the first stem portion 710*a* toward the first side and may be connected to the fifth sub-sound generator 650. The fifth branch portion 710*f* may branch from the first stem portion 710*a* toward the second side and may be connected to the seventh sub-sound generator 670. The sixth branch portion 710*g* may branch from the first stem portion 710*a* toward the second side and may be connected to the ninth sub-sound generator 690. The seventh branch portion 710*h* may branch from the first stem portion 710*a* toward the second side and may be connected to the third connector 712 of the control circuit board 160. To this end, the first connection portion 711 may be formed at an end of the seventh branch portion 710*h*.

In addition, the second main sound generator 520, the second sub-sound generator 620, the fourth sub-sound generator 640, the sixth sub-sound generator 660, the eighth sub-sound generator 680 and the tenth sub-sound generator 700 may be connected to a second flexible circuit board 720, and a second connection portion 721 of the second flexible circuit board 720 may be connected to a fourth connector 722 of the control circuit board 160 placed on the lower surface of the display panel 110 when the flexible films 122 are bent toward the lower surface of the display panel 110 as illustrated in FIG. 4.

For example, the second flexible circuit board 720 may include a second stem portion 720*a* and eighth through fourteenth branch portions 720*b* through 720*h* branching from the second stem portion 720*a*. The eighth branch portion 720*b* may branch from the second stem portion 720*a* toward the first side and may be connected to the second main sound generator 520. The ninth branch portion 720*c* may branch from the second stem portion 720*a* toward the second side and may be connected to the second sub-sound generator 620. The tenth branch portion 720*d* may branch from the second stem portion 720*a* toward the second side and may be connected to the fourth sub-sound generator 640. The eleventh branch portion 720*e* may branch from the second stem portion 720*a* toward the second side and may be connected to the sixth sub-sound generator 660. The twelfth branch portion 720*f* may branch from the second stem portion 720*a* toward the first side and may be connected to the eighth sub-sound generator 680. The thirteenth branch portion 720*g* may branch from the second stem portion 720*a* toward the first side and may be connected to the tenth sub-sound generator 700. The fourteenth branch portion 720*h* may branch from the second stem portion 720*a* toward the first side and may be connected to the fourth connector 722 of the control circuit board 160. To this end, the second connection portion 721 may be formed at an end of the fourteenth branch portion 720*h*.

In FIGS. 3 and 4, a plurality of sound generators, for example, six sound generators are connected to the control circuit board 160 through one flexible circuit board. In other examples, different connection arrangements may be made. For example, the first and second main sound generators 510 and 520 and the first through tenth sub-sound generators 610 through 700 may be connected to the control circuit board 160 through separate flexible circuit boards, respectively.

According to the embodiment illustrated in FIGS. 3 and 4, since a plurality of sound generators are disposed distributed across the rear surface of the display panel 110, and the sound generators are selectively activated individually according to a sound directional mode, sound can be output biased in a specific direction, with maximum sound energy towards a target location.

Figure 5:
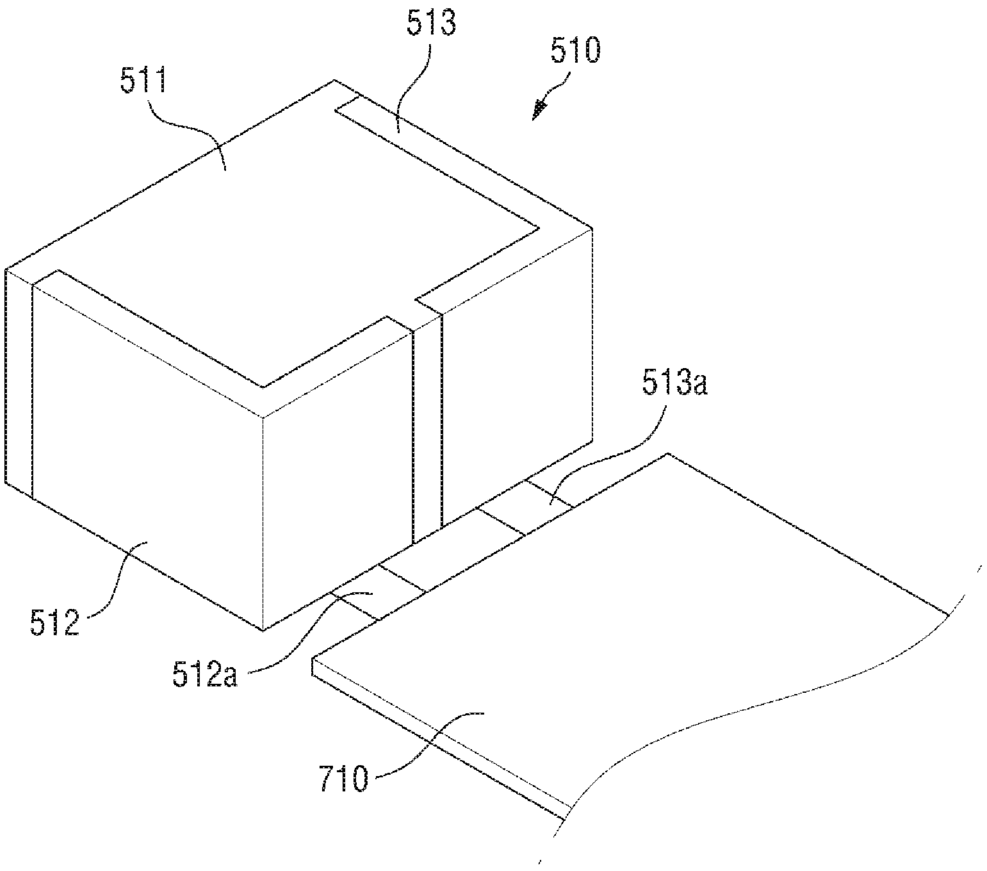
FIG. 5 is a perspective view illustrating an example of a first main sound generator of FIG. 3.
Figure 6:
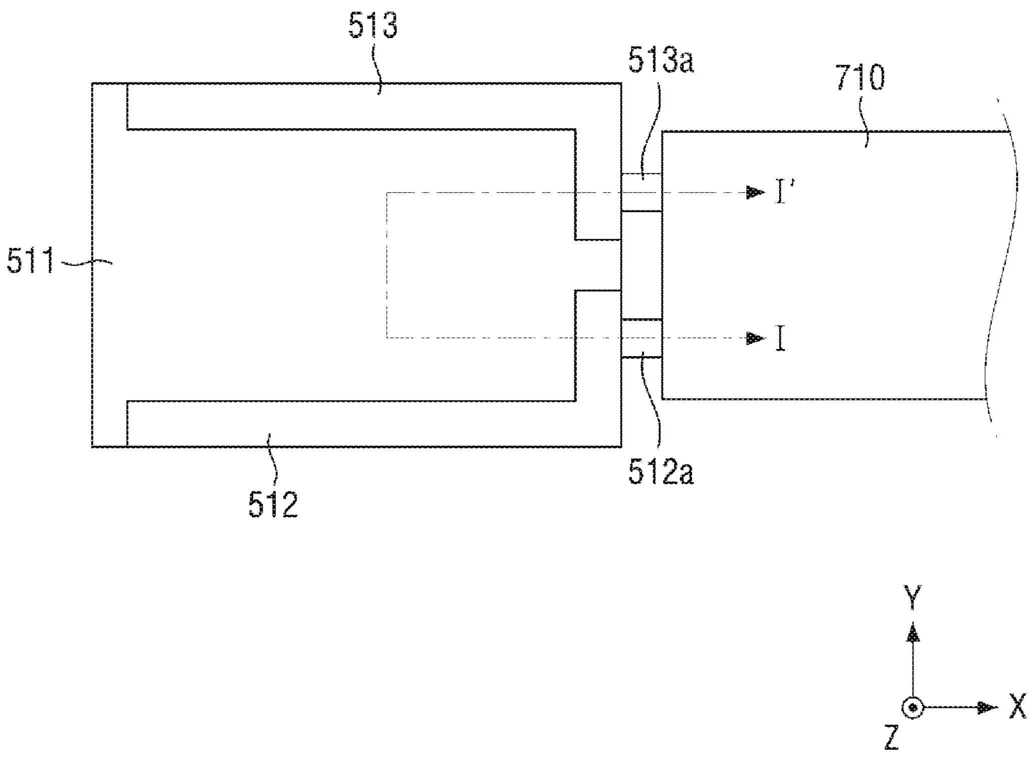
FIG. 6 is a plan view illustrating the example of the first main sound generator of FIG. 3.
Figure 7:
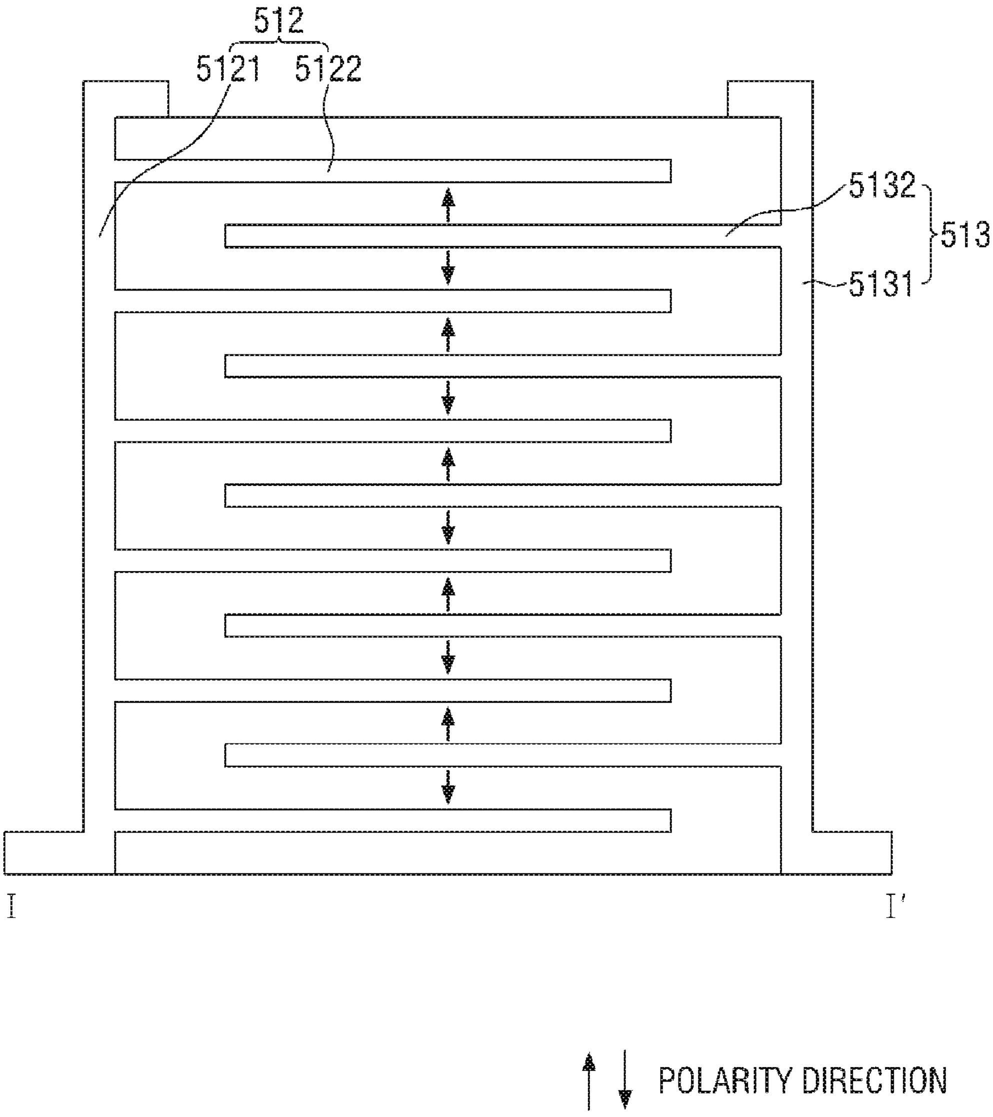
FIG. 7 is a cross-sectional view illustrating an example of I-I' of FIG. 6.

FIG. 5 is a perspective view illustrating an example of the first main sound generator 510 of FIG. 3, and FIG. 6 is a plan view of this example. FIG. 7 is a cross-sectional view illustrating an example of I-I' of FIG. 6.

Referring to FIGS. 5, 6 and 7, the first main sound generator 510 includes a vibration layer 511, a first electrode 512, a second electrode 513, a first pad electrode 512*a*, and a second pad electrode 513*a*.

The first electrode 512 may include a first stem electrode 5121 and first branch electrodes 5122. The first stem electrode 5121 may be disposed on only one side surface of the vibration layer 511 or may be disposed on a plurality of side surfaces of the vibration layer 511 as illustrated in FIGS. 5 and 6. The first stem electrode 5121 may also be disposed on an upper surface of the vibration layer 511. The first branch electrodes 5122 may branch from the first stem electrode 5121. The first branch electrodes 5122 may be arranged parallel to each other.

The second electrode 513 may include a second stem electrode 5131 and second branch electrodes 5132. The second stem electrode 5131 may be disposed on another side surface of the vibration layer 511 or may be disposed on a plurality of side surfaces of the vibration layer 511 as illustrated in FIGS. 5 and 6. Here, as illustrated in FIGS. 5 and 6, the first stem electrode 5121 may be disposed on any one of the side surfaces on which the second stem electrode 5131 is disposed. The second stem electrode 5131 may be disposed on the upper surface of the vibration layer 511. The first stem electrode 5121 and the second stem electrode 5131 may not overlap each other. The second branch electrodes 5132 may branch from the second stem electrode 5131. The second branch electrodes 5132 may be arranged parallel to each other.

The first branch electrodes 5122 and the second branch electrodes 5132 may be arranged parallel to each other in a horizontal direction (X-axis direction or Y-axis direction). Alternatively, the first and second branch electrodes 5122, 5132 may be arranged in a vertical direction (Z-axis direction). That is, the first branch electrodes 5122 and the second branch electrodes 5132 may be repeatedly arranged in the vertical direction (Z-axis direction) in the order of the first branch electrode 5122, the second branch electrode 5132, the first branch electrode 5122, and the second branch electrode 5132.

The first pad electrode 512*a* may be connected to the first electrode 512. The first pad electrode 512*a* may protrude outward from the first stem electrode 5121 disposed on a side surface of the vibration layer 511. The second pad electrode 513*a* may be connected to the second electrode 513. The second pad electrode 513*a* may protrude outward from the second stem electrode 5131 disposed on the side surface of the vibration layer 511. That is, the first pad electrode 512*a* and the second pad electrode 513*a* may protrude outward from the first stem electrode 5121 and the second stem electrode 5131 disposed on the same side surface of the vibration layer 511.

The first pad electrode 512*a* and the second pad electrode 513*a* may be connected to lead lines or pad electrodes of the first flexible circuit board 710. The lead lines or pad electrodes of the first flexible circuit board 710 may be disposed on a lower surface of the first flexible circuit board 710).

The vibration layer 511 may be a piezo actuator that is deformed according to a first driving voltage applied to the first electrode 512 and a second driving voltage applied to the second electrode 513. In this case, the vibration layer 511 may be any one of a piezoelectric material, such as a polyvinylidene fluoride (PVDF) film or plumbum ziconate titanate (PZT), and an electroactive polymer.

Since the production temperature of the vibration layer 511 is high, the first and second electrodes 512, 513 may each be made of silver (Ag) having a high melting point or an alloy of Ag and palladium (Pd). When the first and second electrodes 512, 513 are made of an alloy of Ag and Pd, the content of Ag may be higher than that of Pd in order to increase the electrodes' melting points.

The vibration layer 511 may be disposed between the first branch electrodes 5122 and the second branch electrodes 5132. The vibration layer 511 contracts or expands according to the difference between the first driving voltage applied to a first branch electrode 5122 and the second driving voltage applied to a second branch electrode 5132.

For instance, as illustrated in FIG. 7, the polarity direction of the vibration layer 511 disposed between a first branch electrode 5122 and a second branch electrode 5132 disposed under the first branch electrode 5122 may be an upward direction (T). In this case, the vibration layer 511 has a positive polarity in an upper area adjacent to the first branch electrode 5122 and a negative polarity in a lower area adjacent to the second branch electrode 5132. In addition, the polarity direction of the vibration layer 511 disposed between a second branch electrode 5132 and a first branch electrodes 5122 disposed under the second branch electrode 5132 may be a downward direction (J). In this case, the vibration layer 511 has a negative polarity in an upper area adjacent to the second branch electrode 5132 and a positive polarity in a lower area adjacent to the first branch electrode 5122. The polarity direction of the vibration layer 511 may be determined by a poling process of applying an electric field to the vibration layer 511 using a first branch electrode 5122 and a second branch electrode 5132.

Figure 8:
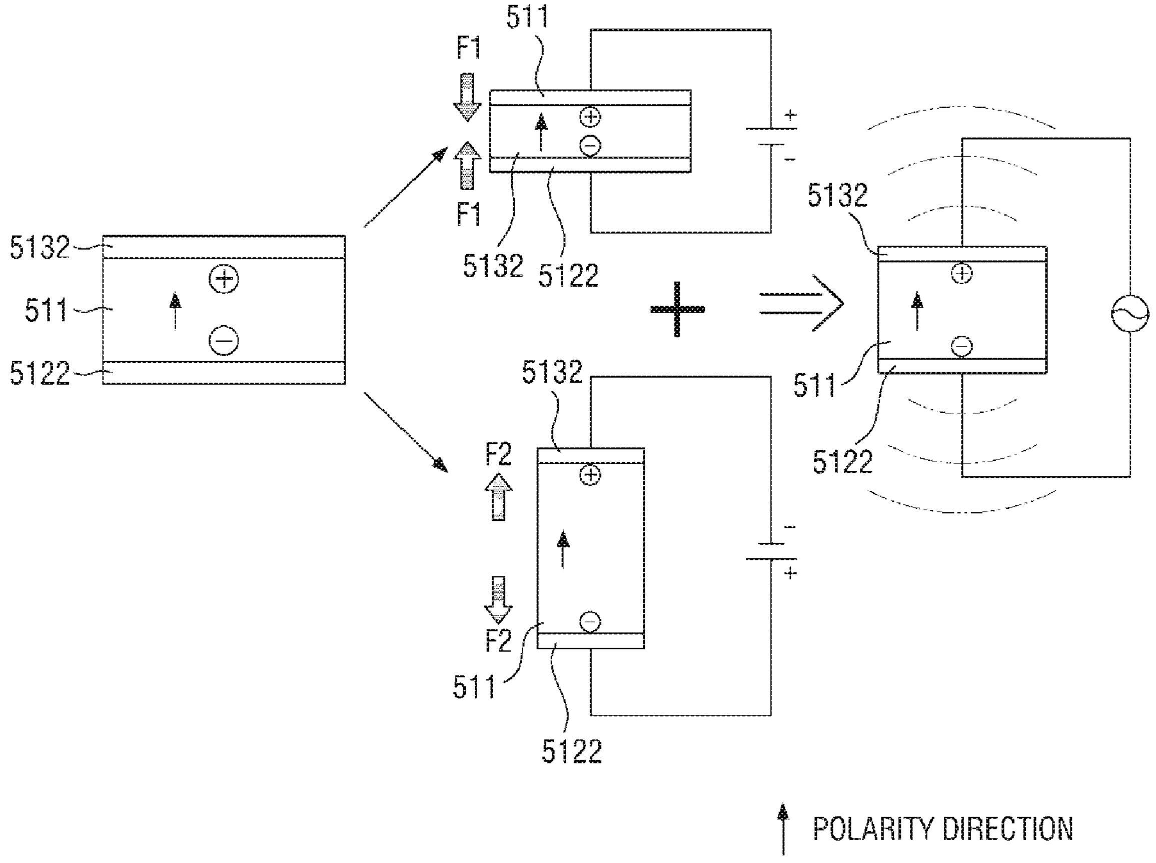
FIG. 8 illustrates a method of vibrating a vibration layer disposed between a first branch electrode and a second branch electrode of the first main sound generator.

Referring to FIG. 8, when the polarity direction of the vibration layer 511 disposed between a first branch electrode 5122 and a second branch electrode 5132 disposed under the first branch electrode 5122 is the upward direction (T), if the first driving voltage of the positive polarity is applied to the first branch electrode 5122 and the second driving voltage of the negative polarity is applied to the second branch electrode 5132, the vibration layer 511 may contract according to a first force F1. The first force F1 may be a compressive force. Also, if the first driving voltage of the negative polarity is applied to the first branch electrode 5122 and the second driving voltage of the positive polarity is applied to the second branch electrode 5132, the vibration layer 511 may expand according to a second force F2. The second force F2 may be a tensile force.

In addition, when the polarity direction of the vibration layer 511 disposed between a second branch electrode 5132 and a first branch electrode 5122 disposed under the second branch electrode 5132 is the downward direction (i), if the first driving voltage of the positive polarity is applied to the second branch electrode 5132 and the second driving voltage of the negative polarity is applied to the first branch electrode 5122, the vibration layer 511 may expand according to a tensile force. Also, if the first driving voltage of the negative polarity is applied to the second branch electrode 5132 and the second driving voltage of the positive polarity is applied to the first branch electrode 5122, the vibration layer 511 may contract according to a compressive force.

According to the embodiment illustrated in FIGS. 5, 6 and 7, if the first driving voltage applied to the first electrode 512 and the second driving voltage applied to the second electrode 513 repeatedly alternate between the positive polarity and the negative polarity, the vibration layer 511 may repeatedly contract and expand, thus causing the first main sound generator 510 to vibrate.

Figure 9:
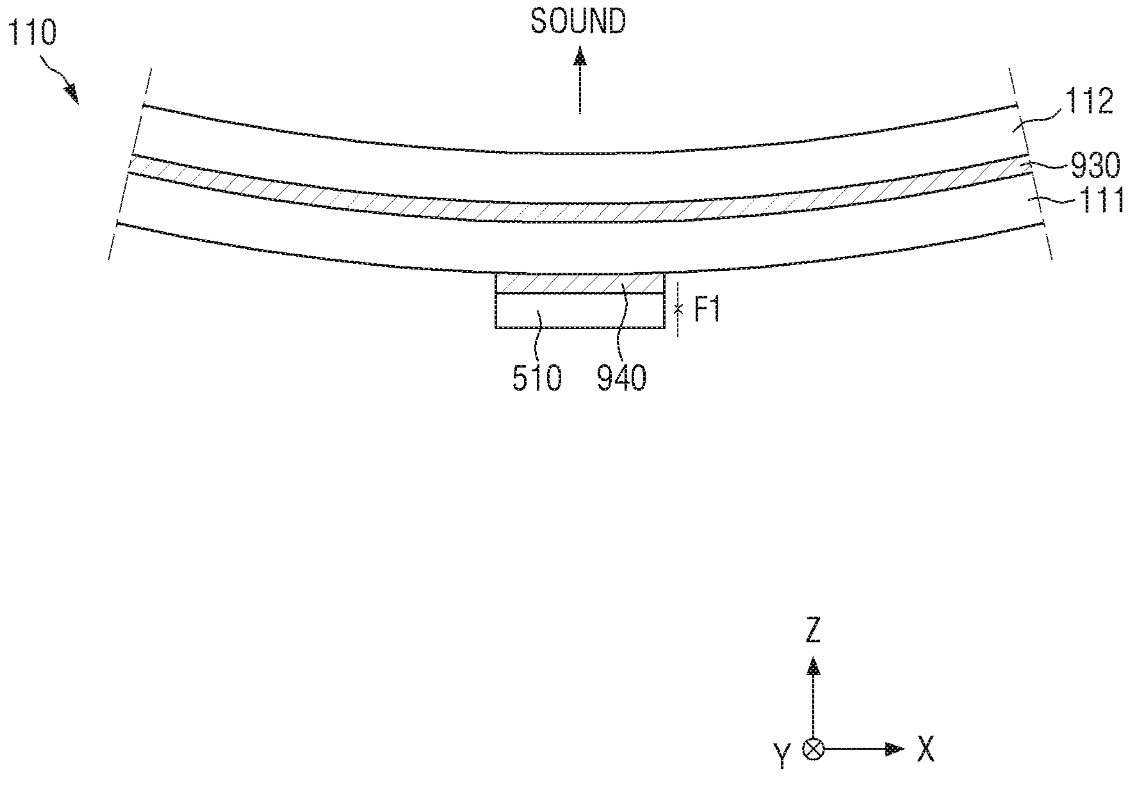
FIGS. 9 and 10 illustrate a method of vibrating the display panel through the vibration of the first main sound generator.
Figure 10:
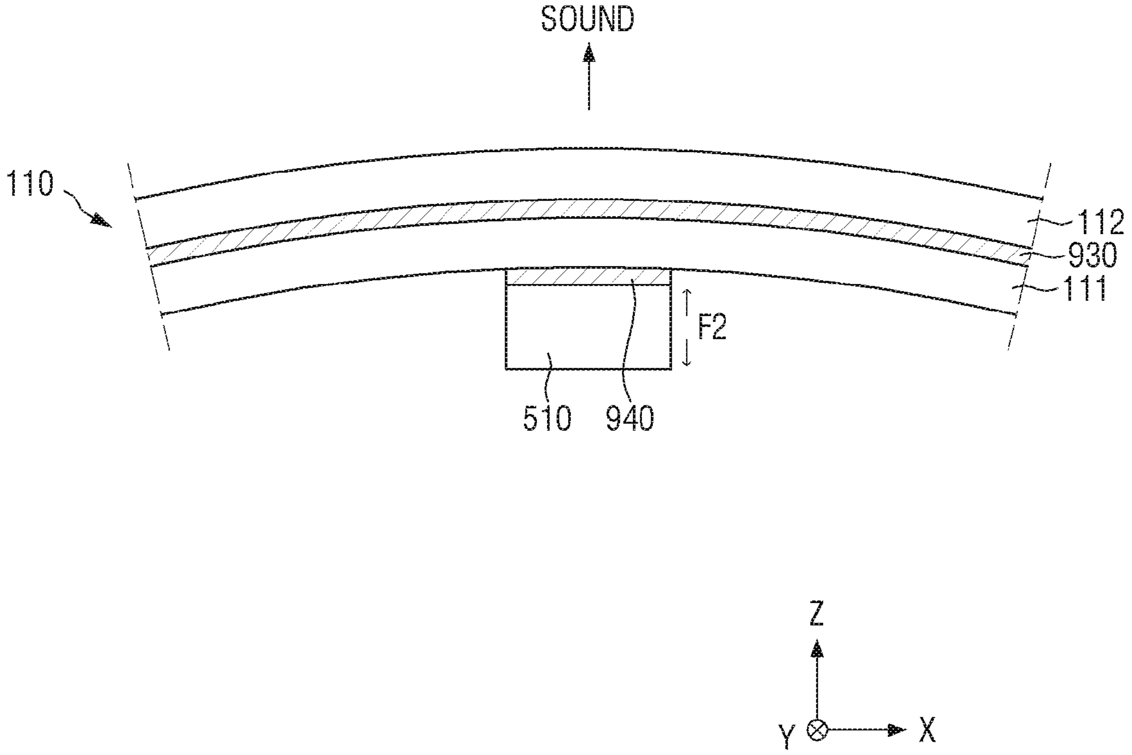

Since the first main sound generator 510 is disposed on the lower surface of the display panel 110, if the vibration layer 511 of the first main sound generator 510 contracts and expands, the display panel 110 may vibrate up and down due to stress, as illustrated in FIGS. 9 and 10. The vibration of the display panel 110 may cause the display device 10 itself to output sound. Note that in the example of FIGS. 9 and 10, a plate 940 is disposed between the sound generator 510 and the lower substrate 111, and a separation layer 930 is disposed between the lower and upper substrates 111, 112.

The second main sound generator 520 and the first through tenth sub-sound generators 610 through 700 may each have substantially the same configuration as the first main sound generator 510 described above with reference to FIGS. 8 through 10, and thus their detailed description will be omitted.

Figure 11:
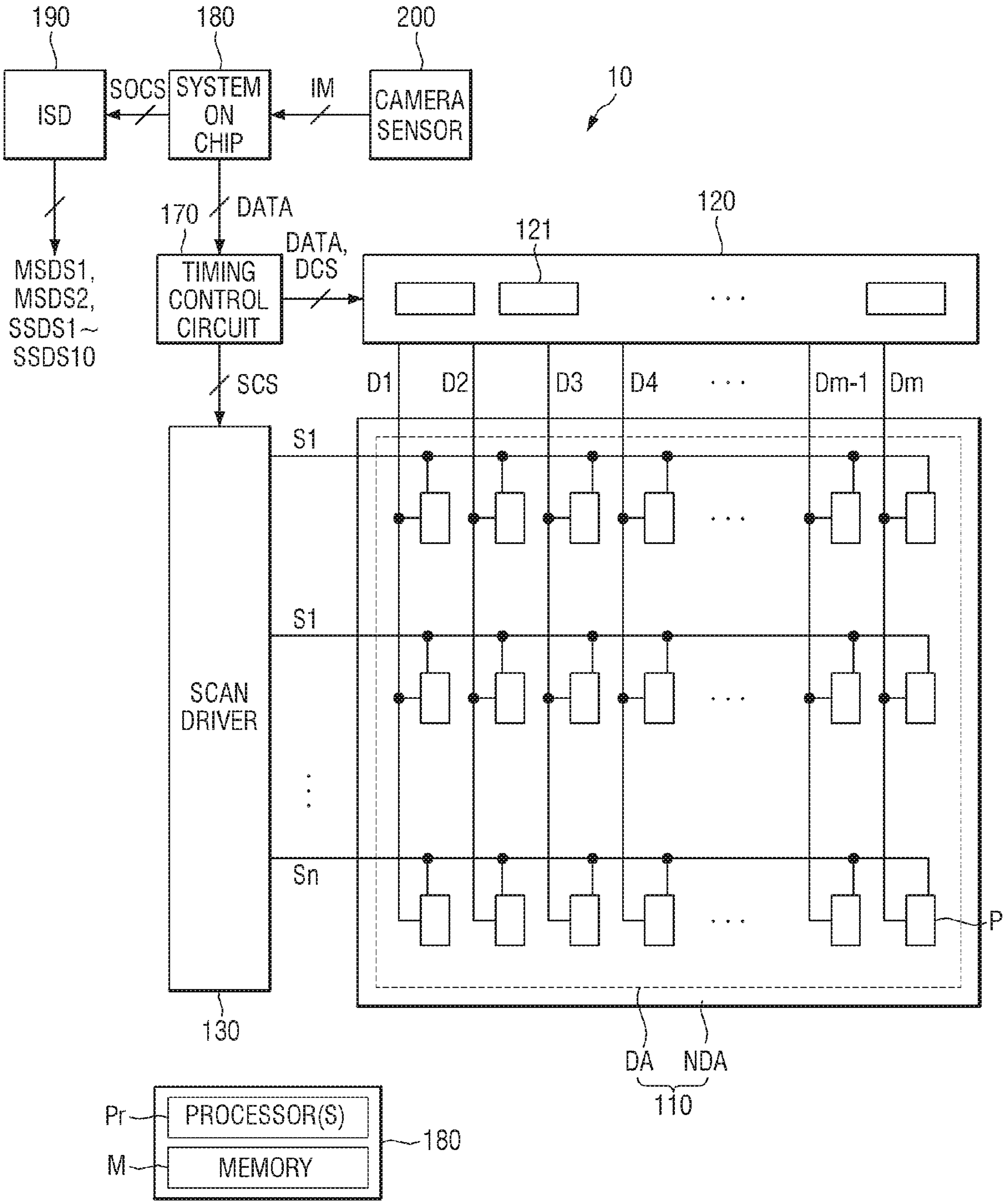
FIG. 11 is a block diagram of the display device according to the embodiment.

FIG. 11 is a block diagram of the display device 10 according to the embodiment. In this example, the display device 10 includes the display panel 110, a data driver 120, a scan driver 130, the timing control circuit 170, processing circuitry 180, and the camera sensor 200. Hereafter processing circuitry 180 will be exemplified and interchangeably referred to as a system on a chip 180, which may include at least one processor Pr and memory M.

The display panel 110 may be divided into a display area DA and a non-display area NDA disposed around the display area DA. The display area DA is an area where pixels P are formed to display an image. The display panel 110 may include data lines D1 through Dm (where m is an integer of 2 or more), scan lines S1 through Sn (where n is an integer of 2 or more) intersecting the data lines D1 through Dm, and the pixels P connected to the data lines D1 through Dm and the scan lines S1 through Sn.

Each of the pixels P may be connected to at least one of the data lines D1 through Dm and at least one of the scan lines S1 through Sn. Each of the pixels P of the display panel 110 may include an organic light emitting element, a plurality of transistors for supplying current to the organic light emitting element, and at least one capacitor. The organic light emitting element may be an organic light emitting diode including a first electrode, an organic light emitting layer, and a second electrode.

The data driver 120 may include a plurality of source driving circuits 121. Each of the source driving circuits 121 receives digital video data DATA and a source control signal DCS from the timing control circuit 170. Each of the source driving circuits 121 converts the digital video data DATA into analog data voltages according to the source control signal DCS and supplies the analog data voltages to the data lines D1 through Dm of the display panel 110.

The scan driver 130 receives a scan control signal SCS from the timing control circuit 170. The scan driver 130 generates scan signals according to the scan control signal SCS and supplies the scan signals to the scan lines S1 through Sn of the display panel 110. The scan driver 130 may include a plurality of transistors and may be formed in the non-display area NDA of the display panel 110. Alternatively, the scan driver 130 may be formed as an integrated circuit, and, in this case, may be mounted on a gate flexible film attached to the lower substrate 111 of the display panel 110.

The timing control circuit 170 receives the digital video data DATA and timing signals from the system on a chip 180. The timing signals may include a vertical sync signal, a horizontal sync signal, a data enable signal, and a dot clock.

The timing control circuit 170 generates control signals for controlling the operation timings of the source driving circuits 121 of the data driver 120 and the operation timing of the scan driver 130. The control signals may include the source control signal DCS for controlling the operation timings of the source driving circuits 121 of the data driver 120 and the scan control signal SCS for controlling the operation timing of the scan driver 130.

The camera sensor 200 may capture an image IM of the area in front of the display device 10 and output the captured image IM to the system on chip 180.

The system on chip 180 analyzes the image IM received from the camera sensor 200 to determine the position of a user. Specifically, the system on chip 180 analyzes the image IM to determine which of the center, the first side, the second side, the third side and the fourth side of the display panel 110 the user is facing.

For instance, when a user is located in front of the center of the display panel 110, the system on chip 180 may control a plurality of sound generators in the first directional mode in which the sound of the sound generators is directed forward from the center of the display panel 110. Herein, "in front of" the display panel is synonymous with "opposing" the display panel, and these terms may be used interchangeably herein. When the user is located opposing the first side of the display panel 110, the system on chip 180 may control the sound generators in the second directional mode in which the sound of the sound generators is directed forward from the first side of the display panel 110. Similarly, when the user is located opposing the second side, the third side, or the fourth side of the display panel 110, the system on chip 180 may control the sound generators in the third, fourth or fifth directional modes, respectively, in which the sound of the sound generators is directed forward from the respective second, third or fourth sides of the display panel 110.

To determine whether a user is located opposing the center or first through fourth sides of the display panel 110, corresponding regions in front of the display panel 110 may be predetermined and the user's head or face may be detected within one of these regions using the camera sensor 200. The regions may be defined with X-Y coordinates, where depth from the display panel in the Z direction may be ignored. (Alternatively, a user may be considered located within one of the regions for the purpose of establishing a directional mode only after ascertaining that his or her depth from the display panel 110 in the Z direction is within a certain range.) For example, when a user is said to be opposing the center of the display device 10, the user's head is detected within a first region surrounding a Z axis running through a central point of the display panel 110. The first region may be circular or polygonal (e.g. rectangular or square). Similarly, when a user is said to be opposing or located in front of the first, second, third, or fourth sides of the display device 10, the user's head is within a predetermined second, third, fourth and fifth predetermined region, respectively, surrounding a respective axis running through a predefined first, second, third and fourth point of the display panel 110. In this manner, boundaries between regions in the X-Y plane are established to enable an objective identification of the region within which the user's head is located. Thereby, an appropriate directional mode may be set based on the user's location.

In addition, when multiple users are located facing more than one of the center and first to fourth sides of the display panel 110, the system on chip 180 may control the sound generators by combining a plurality of directional modes. For example, when users are located in front of the center and the first side of the display panel 110, the system on chip 180 controls the sound generators in the first directional mode, in which the sound of the sound generators is directed forward from the center of the display panel 110, and the second directional mode.

Further, when there is no need for the sound generators to output sound in a particular direction because multiple users are located within different facing multiple positions among the center, the first side, the second side, the third side and the fourth side of the display panel 110, the system on chip 180 may control the sound generators in the non-directional mode.

The system on chip 180 may generate a sound control signal SOCS for controlling the sound generators and output the sound control signal SOCS to an integrated sound driver 190.

The integrated sound driver 190 may generate a plurality of sound driving signals MSDS1, MSDS2 and SSDS1 through SSDS10 according to the sound control signal SOCS and output the sound driving signals MSDS1, MSDS2 and SSDS1 through SSDS10 to the sound generators.

The integrated sound driver 190 may include a digital signal processor (DSP) for processing the sound control signal SOCS which is a digital signal, a digital-to-analog converter (DAC) for converting the digital signal processed by the DSP into the sound driving signals MSDS1, MSDS2 and SSDS1 through SSDS10 which are analog signals, and an amplifier (AMP) for amplifying the analog signals output from the DAC and outputting the amplified analog signals.

The sound driving signals MSDS1, MSDS2 and SSDS1 through SSDS10 may include a first main sound driving signal MSDS1 for driving the first main sound generator 510 and a second main sound driving signal MSDS2 for driving the second main sound generator 520. In addition, the sound driving signals MSDS1, MSDS2 and SSDS1 through SSDS10 may further include first through tenth sub-sound driving signals SSDS1 through SSDS10 for driving the first through tenth sub-sound generators 610 through 700.

The sound driving signals MSDS1, MSDS2 and SSDS1 through SSDS10 may include at least two driving voltages applied respectively to the first and second electrodes of each of the sound generators as illustrated in FIGS. 5 through 7. In addition, each of the at least two driving voltages may be an alternating current voltage that swings between a positive polarity and a negative polarity with respect to a predetermined reference voltage.

The integrated sound driver 190 may be mounted on the system circuit board together with the system on chip 180 or mounted on the control circuit board 160 together with the timing control circuit 170.

In FIG. 11, the display device 10 includes one integrated sound driver 190 to output a plurality of sound driving signals MSDS1, MSDS2 and SSDS1 through SSDS10 to a plurality of sound generators. However, the present disclosure is not limited to this case. That is, the display device 10 may also include a plurality of sound drivers connected one-to-one to the sound generators. Alternatively, the display device 10 may include a main sound driver connected to the first main sound generator 510 and the second main sound generator 520 and a sub-sound driver connected to the first through tenth sub-sound generators 610 through 700.

The system on chip 180 may include a scaler for converting the digital video data DATA input from the outside according to the resolution of the display panel 110. The system on chip 180 may include a converter for converting the digital video data DATA to enhance the quality of an image. The system on chip 180 outputs the digital video data DATA to the timing control circuit 170.

Figure 12:
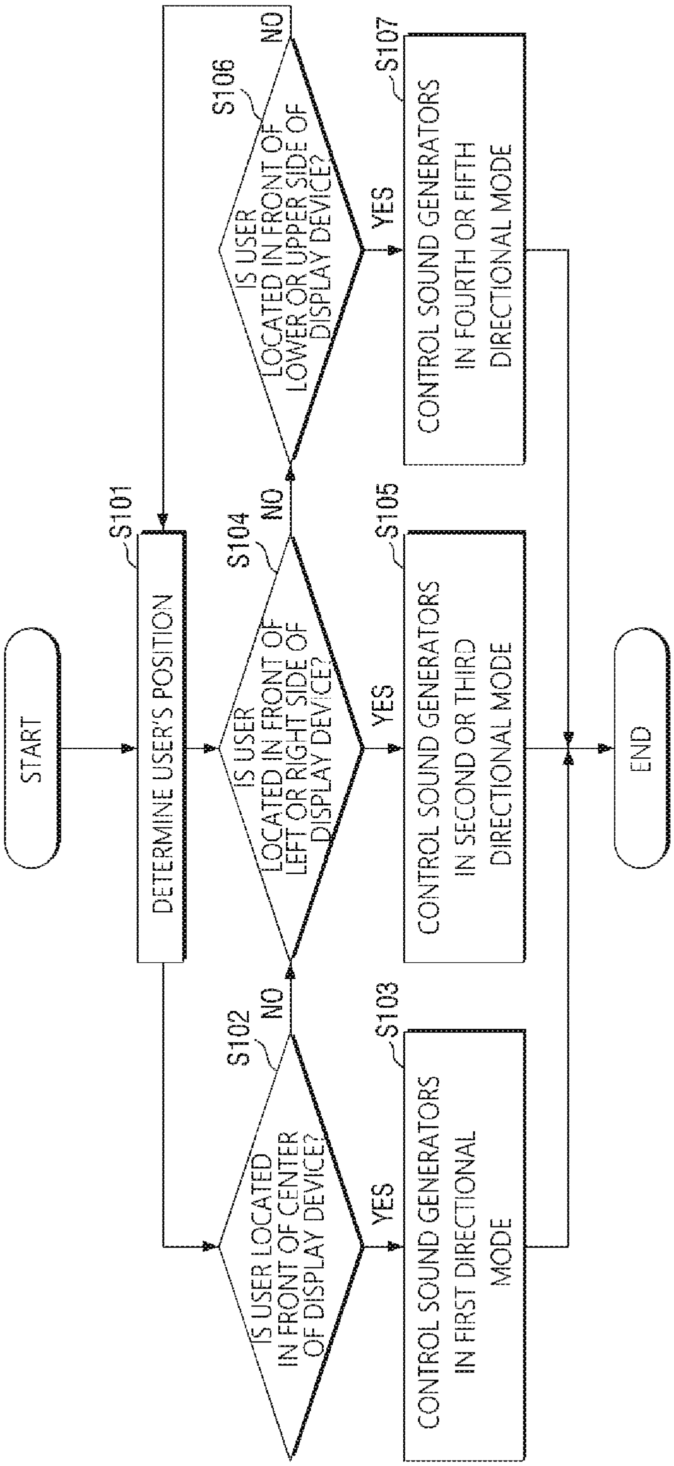
FIG. 12 is a flowchart illustrating a method of driving the display device according to the embodiment.

FIG. 12 is a flowchart illustrating a method of driving the display device 10 according to the embodiment. The method may be performed by means of the at least one processor Pr of system on chip 180 executing instructions read from its memory M. In the method, first, the system on chip 180 receives a captured image of the area in front of the display device 10 from the camera sensor 200. The system on chip 180 analyzes the image captured by the camera sensor 200 to determine which of the center, the first side, the second side, the third side and the fourth side of the display device 10 a user is opposing. For instance, the system on chip 180 may find the user's face in the image captured by the camera sensor 200 so as to determine which display panel area among the center, the first side, the second side, the third side and the fourth side of the display device 10 the user's face opposes (operation S101 in FIG. 12).

Figure 13A:
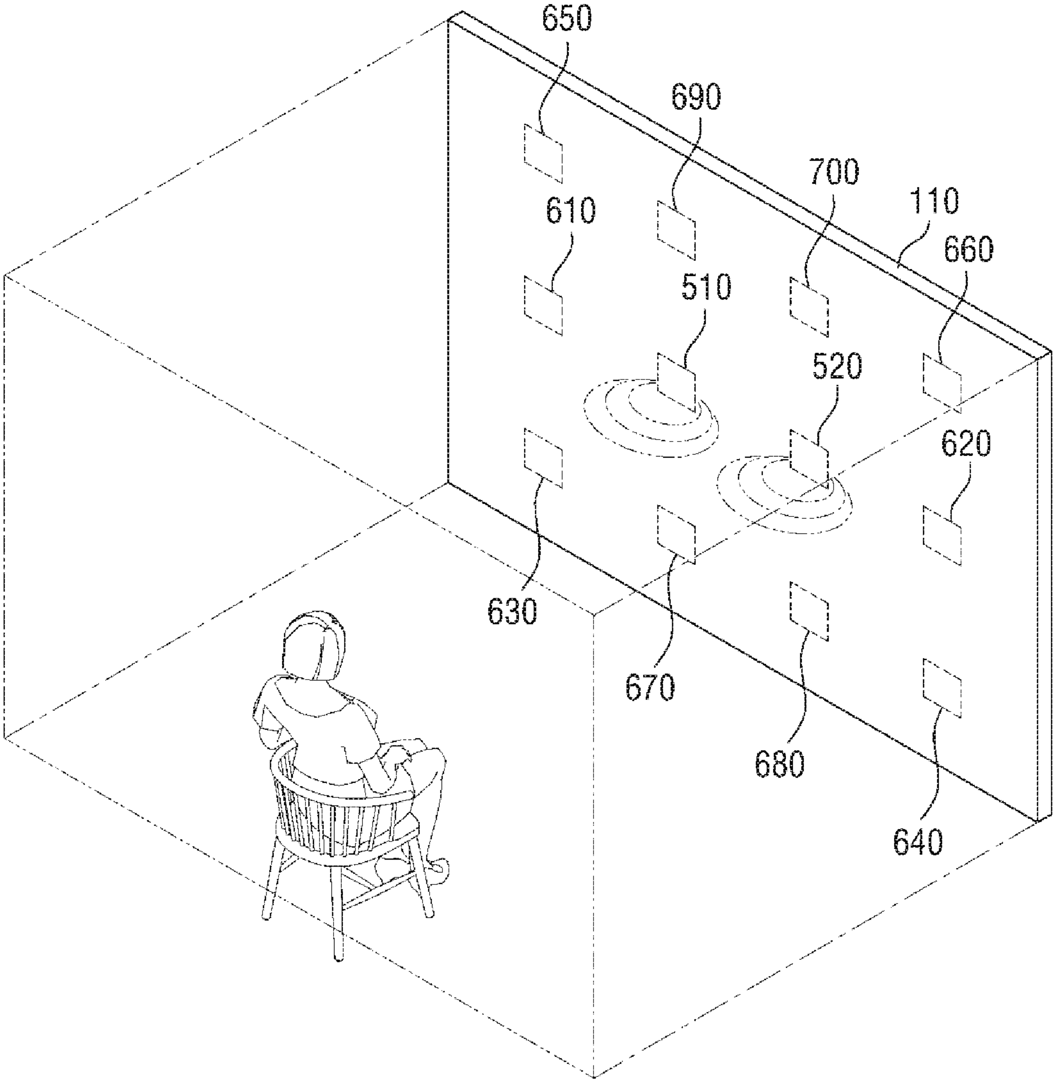
FIGS. 13A, 13B, 13C, 13D and 13E illustrate example sound output of sound generators when a user is located opposing a center, a first side, a second side, a third side and a fourth side, respectively, of the display device.

Second, when the user is located in front of the center of the display device 10 as illustrated in FIG. 13A, the system on chip 180 controls a plurality of sound generators in the first directional mode. For example, the system on chip 180 outputs sound by vibrating the display panel 110 using just the first and second main sound generators 510, 520 among all the sound generators as illustrated in FIG. 13A (operations S102 and S103 in FIG. 12).

Specifically, the system on chip 180 outputs the sound control signal SOCS to the integrated sound driver 190 such that the display panel 110 is vibrated by the first main sound generator 510 to output sound, the display panel 110 is vibrated by the second main sound generator 520 to output sound, and no sound is output by the first through tenth sub-sound generators 610 through 700.

The integrated sound driver 190 outputs the first main sound driving signal MSDS1 to the first main sound generator 510 and outputs the second main sound driving signal MSDS2 to the second main sound generator 520. In addition, the integrated sound driver 190 does not output the first through tenth sub-sound driving signals SSDS1 through SSDS10 to the first through tenth sub-sound generators 610 through 700. Alternatively, the integrated sound driver 190 may output the first through tenth sub-sound driving signals SSDS1 through SSDS10 such that the vibration layer 511 of each of the first through tenth sub-sound generators 610 through 700 does not vibrate. In this case, each of the first through tenth sub-sound driving signals SSDS1 through SSDS10 may have a direct current voltage or at least two driving voltages of the same voltage.

Therefore, in the first directional mode, the first main sound generator 510 outputs sound by vibrating the display panel 110 in response to the first main sound driving signal MSDS1, and the second main sound generator 520 outputs sound by vibrating the display panel 110 in response to the second main sound driving signal MSDS2. Accordingly, in the first directional mode, the display device 10 may output sound primarily forward from the center of the display device 10 as illustrated in FIG. 13A, e.g., with maximum sound energy directed towards one or more users at a location opposing the center of the display panel 110. This may effectively reduce the level of unwanted sound arriving at locations other than the region opposing the center of the display panel 110, such as outside the X-Y periphery of the display panel 110 where persons disinterested in the sound are situated.

Figure 14:
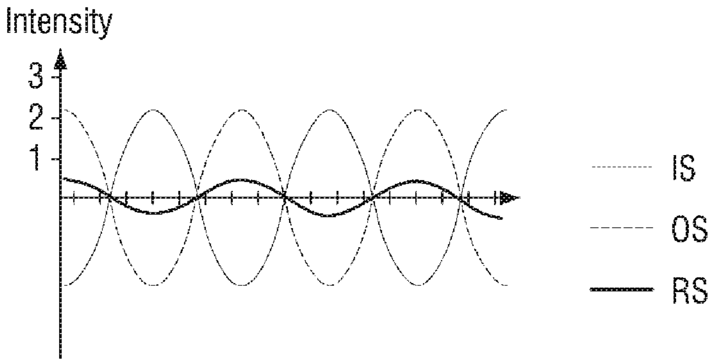
FIG. 14 is a diagram for explaining noise cancellation of sound output by a first main sound generator according to an embodiment.

In FIG. 13A, the first through tenth sub-sound generators 610 through 700 do not output sound by not vibrating the display panel 110. However, the present disclosure is not limited to this case. For example, each of the first through tenth sub-sound generators 610 through 700 may output a sound wave that can cancel out sound traveling in a direction other than the direction forward from the center of the display device 10 among the sound output by the first main sound generator 510 and the sound output by the second main sound generator 520. To this end, a sound wave with an opposite phase to the sound output by the first main sound generator 510 or the sound output by the second main sound generator 520 may be output by each of the first through tenth sub-sound generators 610 through 700 as illustrated in FIG. 14. In FIG. 14, sound OS output by the first main sound driving signal MSDS1 or the second main sound driving signal MSDS2, a canceling sound wave IS for canceling the output sound OS, and sound RS reduced by the cancelling sound wave IS are illustrated. That is, each of the first through tenth sub-sound generators 610 through 700 may output a sound wave for noise cancellation. Accordingly, this can further reduce instances in which sound reaches people not located in a region opposing the center of the display device 10.

Figure 13B:
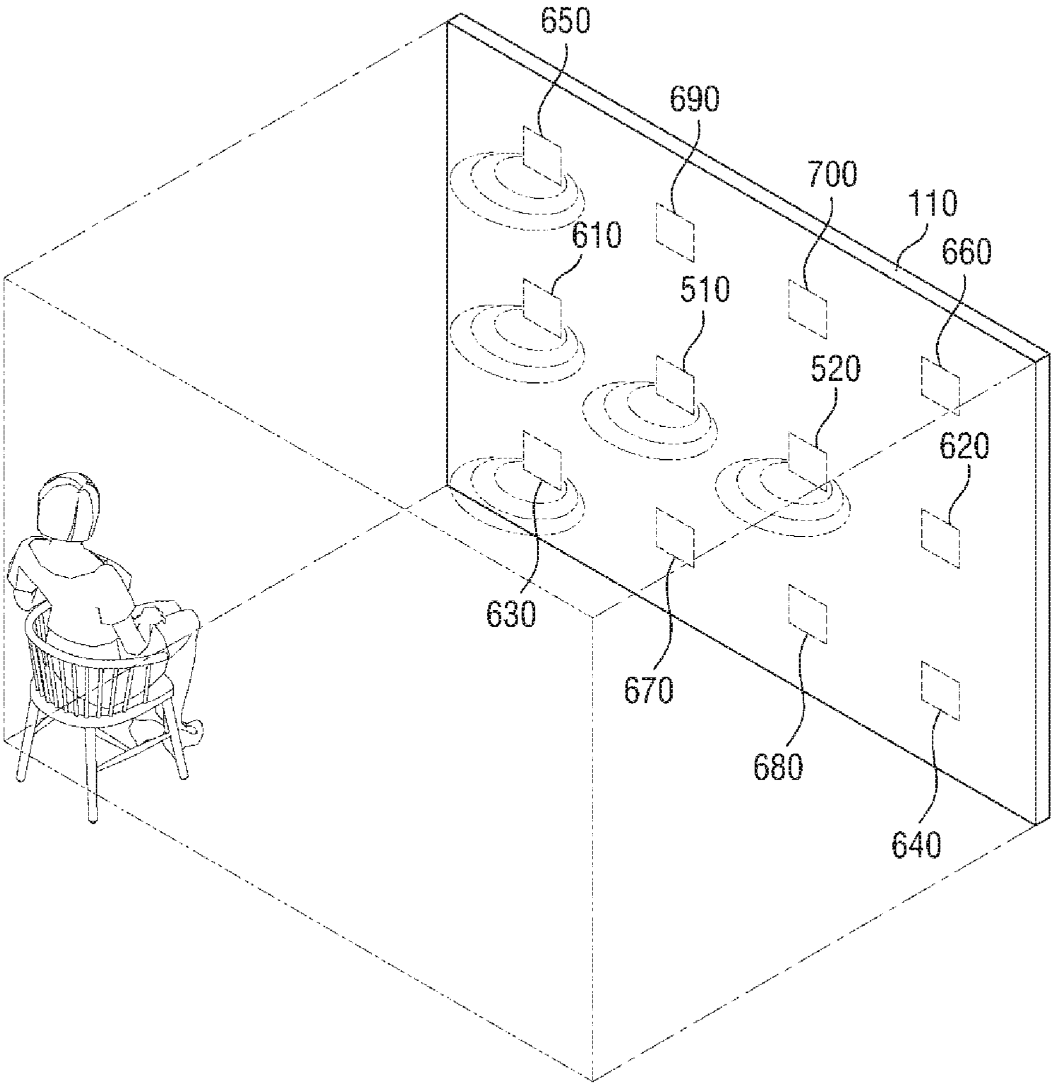
Figure 13C:
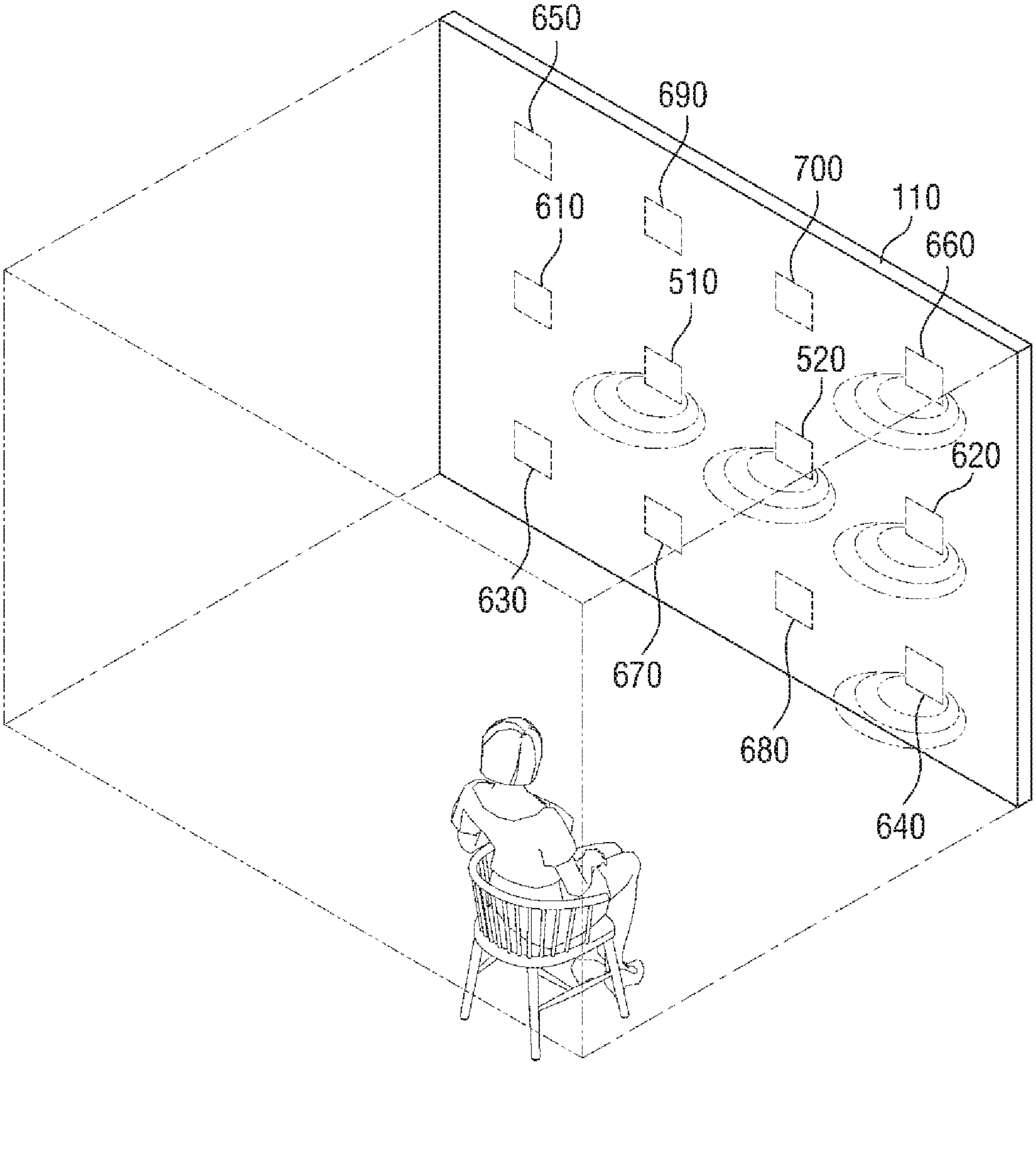

Third, when the user is located in front of the first side of the display device 10 as illustrated in FIG. 13B, the system on chip 180 controls the sound generators in the second directional mode. In the second directional mode, the system on chip 180 outputs sound by vibrating the display panel 110 using the first main sound generator 510, the second main sound generator 520, the first sub-sound generator 610, the third sub-sound generator 630 and the fifth sub-sound generator 650 among the sound generators as illustrated in FIG. 13B. In addition, when the user is located in front of the second side of the display device 10 as illustrated in FIG. 13C, the system on chip 180 controls the sound generators in the third directional mode. In the third directional mode, the system on chip 180 outputs sound by vibrating the display panel 110 using the first main sound generator 510, the second main sound generator 520, the second sub-sound generator 620, the fourth sub-sound generator 640 and the sixth sub-sound generator 660 among the sound generators as illustrated in FIG. 13C (operations S104 and S105 in FIG. 12).

For example, in the second directional mode, the system on chip 180 outputs the sound control signal SOCS to the integrated sound driver 190 such that the display panel 110 is vibrated to output sound by the first main sound generator 510, the second main sound generator 520, the first sub-sound generator 610, the third sub-sound generator 630 and the fifth sub-sound generator 650 and that no sound is output by the second sub-sound generator 620, the fourth sub-sound generator 640 and the sixth through tenth sub-sound generators 660 through 700.

In the second directional mode, the integrated sound driver 190 outputs the first main sound driving signal MSDS1 to the first main sound generator 510 and outputs the second main sound driving signal MSDS2 to the second main sound generator 520. In addition, in the second directional mode, the integrated sound driver 190 outputs the first sub-sound driving signal SSDS1 to the first sub-sound generator 610, outputs the third sub-sound driving signal SSDS3 to the third sub-sound generator 630, and outputs the fifth sub-sound driving signal SSDS5 to the fifth sub-sound generator 650. Further, the integrated sound driver 190 does not output the second, fourth, and sixth through tenth sub-sound driving signals SSDS2, SSDS4, and SSDS6 through SSDS10 to the second, fourth, and sixth through tenth sub-sound generators 620, 640, and 660 through 700. Alternatively, the integrated sound driver 190 may output the second, fourth, and sixth through tenth sub-sound driving signals SSDS2, SSDS4, and SSDS6 through SSDS10 such that the vibration layer 511 of each of the second, fourth, and sixth through tenth sub-sound generators 620, 640, and 660 through 700 does not vibrate. In this case, each of the second, fourth, and sixth through tenth sub-sound driving signals SSDS2, SSDS4, and SSDS6 through SSDS10 may have a direct current voltage or at least two driving voltages of the same voltage.

Therefore, in the second directional mode, the first main sound generator 510 outputs sound by vibrating the display panel 110 in response to the first main sound driving signal MSDS1, and the second main sound generator 520 outputs sound by vibrating the display panel 110 in response to the second main sound driving signal MSDS2. In addition, in the second directional mode, the first sub-sound generator 610 outputs sound by vibrating the display panel 110 in response to the first sub-sound driving signal SSDS1, the third sub-sound generator 630 outputs sound by vibrating the display panel 110 in response to the third sub-sound driving signal SSDS3, and the fifth sub-sound generator 650 outputs sound by vibrating the display panel 110 in response to the fifth sub-sound driving signal SSDS5.

Accordingly, in the second directional mode, the display device 10 may output sound primarily forward from the first side of the display device 10 as illustrated in FIG. 13B. This may effectively reduce the level of unwanted sound arriving at locations other than the region opposing the first side of the display panel 110, such as outside the X-Y periphery of the display panel 110 where persons disinterested in the sound are located.

In addition, in the third directional mode, the system on chip 180 outputs the sound control signal SOCS to the integrated sound driver 190 such that the display panel 110 is vibrated to output sound by the first main sound generator 510, the second main sound generator 520, the second sub-sound generator 620, the fourth sub-sound generator 640 and the sixth sub-sound generator 660 and that no sound is output by the first sub-sound generator 610, the third sub-sound generator 630, the fifth sub-sound generator 650, and the seventh through tenth sub-sound generators 670 through 700.

In the third directional mode, the integrated sound driver 190 outputs the first main sound driving signal MSDS1 to the first main sound generator 510 and outputs the second main sound driving signal MSDS2 to the second main sound generator 520. In addition, in the third directional mode, the integrated sound driver 190 outputs the second sub-sound driving signal SSDS2 to the second sub-sound generator 620, outputs the fourth sub-sound driving signal SSDS4 to the fourth sub-sound generator 640, and outputs the sixth sub-sound driving signal SSDS6 to the sixth sub-sound generator 660. Further, the integrated sound driver 190 does not output the first, third, fifth, and seventh through tenth sub-sound driving signals SSDS1, SSDS3, SSDS5, and SSDS7 through SSDS10 to the first, third, fifth and seventh through tenth sub-sound generators 610, 630, 650 and 670 through 700. Alternatively, the integrated sound driver 190 may output the first, third, fifth, and seventh through tenth sub-sound driving signals SSDS1, SSDS3, SSDS5, and SSDS7 through SSDS10 such that the vibration layer 511 of each of the first, third, fifth, and seventh through tenth sub-sound generators 610, 630, 650, and 670 through 700 does not vibrate. In this case, each of the first, third, fifth, and seventh through tenth sub-sound driving signals SSDS1, SSDS3, SSDS5, and SSDS7 through SSDS10 may have a direct current voltage or at least two driving voltages of the same voltage.

Therefore, in the third directional mode, the first main sound generator 510 outputs sound by vibrating the display panel 110 in response to the first main sound driving signal MSDS1, and the second main sound generator 520 outputs sound by vibrating the display panel 110 in response to the second main sound driving signal MSDS2. In addition, in the third directional mode, the second sub-sound generator 620 outputs sound by vibrating the display panel 110 in response to the second sub-sound driving signal SSDS2, the fourth sub-sound generator 640 outputs sound by vibrating the display panel 110 in response to the fourth sub-sound driving signal SSDS4, and the sixth sub-sound generator 660 outputs sound by vibrating the display panel 110 in response to the sixth sub-sound driving signal SSDS6.

Accordingly, in the third directional mode, the display device 10 may output sound forward from the second side of the display device 10 as illustrated in FIG. 13C. This may effectively reduce the level of unwanted sound arriving at locations other than the region opposing the second side of the display panel 110, such as outside the X-Y periphery of the display panel 110 where persons disinterested in the sound are present.

In the second directional mode, each of the second, fourth, and sixth through tenth sub-sound generators 620, 640, and 660 through 700 may output a sound wave (e.g., an opposite-phase sound wave) that can cancel out sound travelling in a direction other than the direction forward from the first side of the display device 10 among the sound output by the first main sound generator 510 and the sound output by the second main sound generator 520. In addition, in the third directional mode, each of the first, third, fifth, and seventh through tenth sub-sound generators 610, 630, 650, and 670 through 700 may output a sound wave (e.g., an opposite-phase sound wave) that can cancel out sound travelling in a direction other than the direction forward from the second side of the display device 10 among the sound output by the first main sound generator 510 and the sound output by the second main sound generator 520.

Figure 13D:
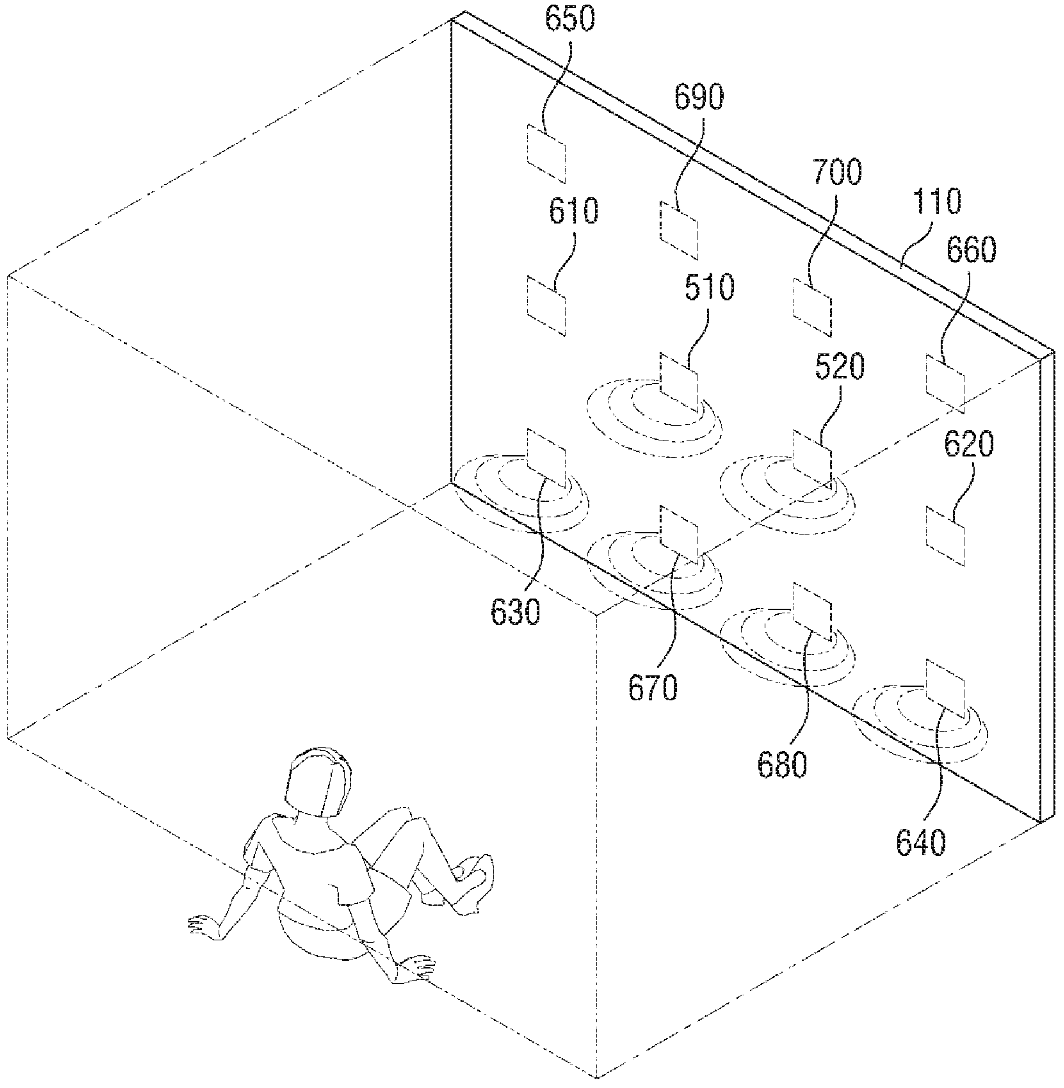
Figure 13E:
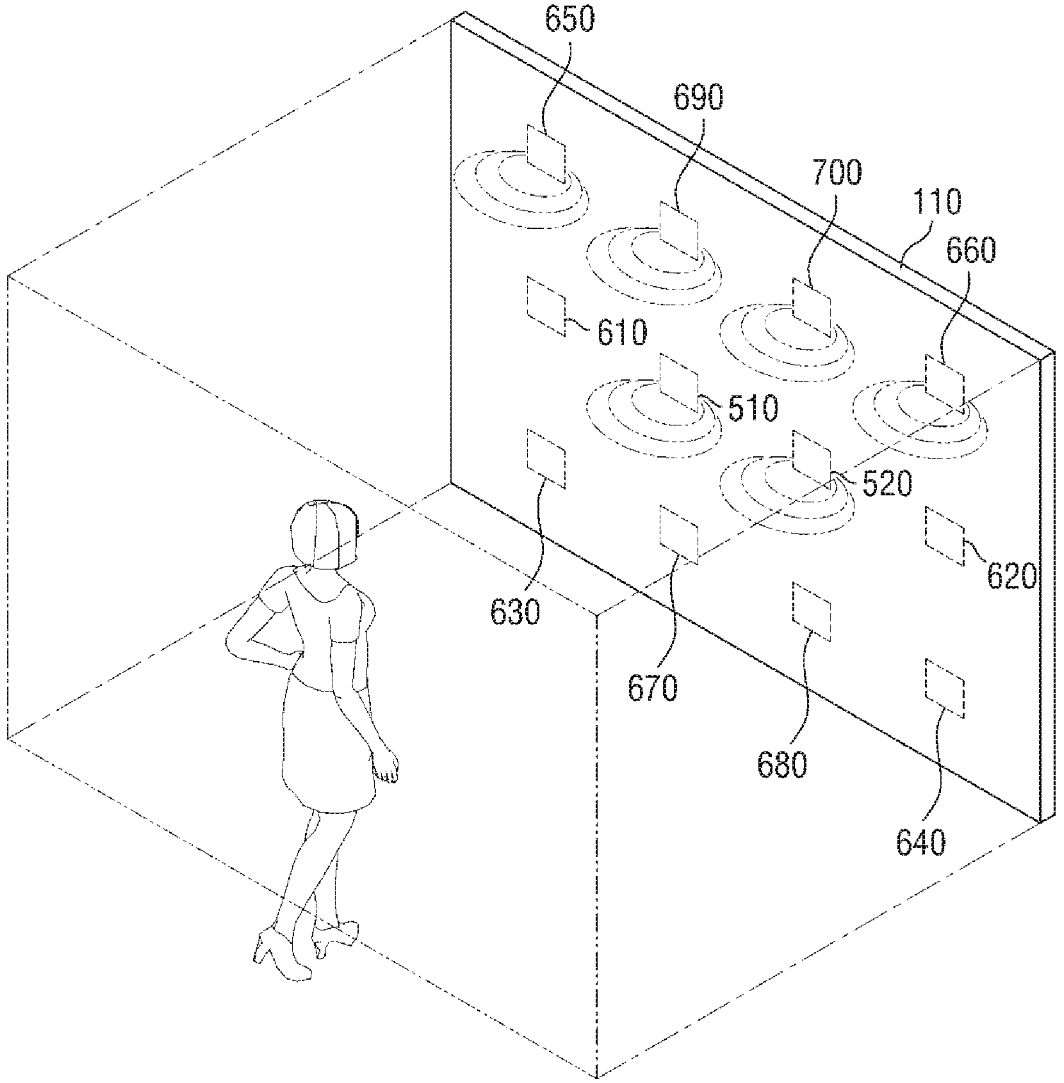

Fourth, when the user is located in front of the third side of the display device 10 as illustrated in FIG. 13D, the system on chip 180 controls the sound generators in the fourth directional mode. In the fourth directional mode, the system on chip 180 outputs sound by vibrating the display panel 110 using the first main sound generator 510, the second main sound generator 520, the third sub-sound generator 630, the fourth sub-sound generator 640, the seventh sub-sound generator 670 and the eighth sub-sound generator 680 among the sound generators as illustrated in FIG. 13D. In addition, when the user is located opposing the fourth side of the display device 10 as illustrated in FIG. 13E, the system on chip 180 controls the sound generators in the fifth directional mode. In the fifth directional mode, the system on chip 180 outputs sound by vibrating the display panel 110 using the first main sound generator 510, the second main sound generator 520, the fifth sub-sound generator 650, the sixth sub-sound generator 660, the ninth sub-sound generator 690 and the tenth sub-sound generator 700 among the sound generators as illustrated in FIG. 13E (operations S106 and S107 in FIG. 12).

Specifically, in the fourth directional mode, the system on chip 180 outputs the sound control signal SOCS to the integrated sound driver 190 such that the display panel 110 is vibrated to output sound by the first main sound generator 510, the second main sound generator 520, the third sub-sound generator 630, the fourth sub-sound generator 640, the seventh sub-sound generator 670 and the eighth sub-sound generator 680 and that no sound is output by the first sub-sound generator 610, the second sub-sound generator 620, the fifth sub-sound generator 650, the sixth sub-sound generator 660, the ninth sub-sound generator 690 and the tenth sub-sound generator 700.

In the fourth directional mode, the integrated sound driver 190 outputs the first main sound driving signal MSDS1 to the first main sound generator 510 and outputs the second main sound driving signal MSDS2 to the second main sound generator 520. In addition, in the fourth directional mode, the integrated sound driver 190 outputs the third sub-sound driving signal SSDS3 to the third sub-sound generator 630, outputs the fourth sub-sound driving signal SSDS4 to the fourth sub-sound generator 640, outputs the seventh sub-sound driving signal SSDS7 to the seventh sub-sound generator 670, and outputs the eighth sub-sound driving signal SSDS8 to the eighth sub-sound generator 680. Further, the integrated sound driver 190 does not output the first, second, fifth, sixth, ninth and tenth sub-sound driving signals SSDS1, SSDS2, SSDS5, SSDS6, SSDS9 and SSDS10 to the first, second, fifth, sixth, ninth and tenth sub-sound generators 610, 620, 650, 660, 690 and 700. Alternatively, the integrated sound driver 190 may output the first, second, fifth, sixth, ninth and tenth sub-sound driving signals SSDS1, SSDS2, SSDS5, SSDS6, SSDS9 and SSDS10 such that the vibration layer 511 of each of the first, second, fifth, sixth, ninth and tenth sub-sound generators 610, 620, 650, 660, 690 and 700 does not vibrate. In this case, each of the first, second, fifth, sixth, ninth and tenth sub-sound driving signals SSDS1, SSDS2, SSDS5, SSDS6, SSDS9 and SSDS10 may have a direct current voltage or at least two driving voltages of the same voltage.

Therefore, in the fourth directional mode, the first main sound generator 510 outputs sound by vibrating the display panel 110 in response to the first main sound driving signal MSDS1, and the second main sound generator 520 outputs sound by vibrating the display panel 110 in response to the second main sound driving signal MSDS2. In addition, in the fourth directional mode, the third sub-sound generator 630 outputs sound by vibrating the display panel 110 in response to the third sub-sound driving signal SSDS3, the fourth sub-sound generator 640 outputs sound by vibrating the display panel 110 in response to the fourth sub-sound driving signal SSDS4, the seventh sub-sound generator 670 outputs sound by vibrating the display panel 110 in response to the seventh sub-sound driving signal SSDS7, and the eighth sub-sound generator 680 outputs sound by vibrating the display panel 110 in response to the eighth sub-sound driving signal SSDS8.

Accordingly, in the fourth directional mode, the display device 10 may output sound originating primarily from the third side of the display device 10 as illustrated in FIG. 13D. This may effectively reduce the level of unwanted sound arriving at locations other than the region opposing the third side of the display panel 110, such as outside the X-Y periphery of the display panel 110 where persons disinterested in the sound are situated.

In addition, in the fifth directional mode, the system on chip 180 outputs the sound control signal SOCS to the integrated sound driver 190 such that the display panel 110 is vibrated to output sound by the first main sound generator 510, the second main sound generator 520, the fifth sub-sound generator 650, the sixth sub-sound generator 660, the ninth sub-sound generator 690 and the tenth sub-sound generator 700 and that no sound is output by the first through fourth sub-sound generators 610 through 640, the seventh sub-sound generator 670 and the eighth sub-sound generator 680.

In the fifth directional mode, the integrated sound driver 190 outputs the first main sound driving signal MSDS1 to the first main sound generator 510 and outputs the second main sound driving signal MSDS2 to the second main sound generator 520. In addition, in the fifth directional mode, the integrated sound driver 190 outputs the fifth sub-sound driving signal SSDS5 to the fifth sub-sound generator 650, outputs the sixth sub-sound driving signal SSDS6 to the sixth sub-sound generator 660, outputs the ninth sub-sound driving signal SSDS9 to the ninth sub-sound generator 690, and outputs the tenth sub-sound driving signal SSDS10 to the tenth sub-sound generator 700. Further, the integrated sound driver 190 does not output the first through fourth, seventh and eighth sub-sound driving signals SSDS1 through SSDS4, SSDS7 and SSDS8 to the first through fourth, seventh and eighth sub-sound generators 610 through 640, 670 and 680. Alternatively, the integrated sound driver 190 may output the first through fourth, seventh and eighth sub-sound driving signals SSDS1 through SSDS4, SSDS7 and SSDS8 such that the vibration layer 511 of each of the first through fourth, seventh and eighth sub-sound generators 610 through 640, 670 and 680 does not vibrate. In this case, each of the first through fourth, seventh and eighth sub-sound driving signals SSDS1 through SSDS4, SSDS7 and SSDS8 may have a direct current voltage or at least two driving voltages of the same voltage.

Therefore, in the fifth directional mode, the first main sound generator 510 outputs sound by vibrating the display panel 110 in response to the first main sound driving signal MSDS1, and the second main sound generator 520 outputs sound by vibrating the display panel 110 in response to the second main sound driving signal MSDS2. In addition, in the fifth directional mode, the fifth sub-sound generator 650 outputs sound by vibrating the display panel 110 in response to the fifth sub-sound driving signal SSDS5, the sixth sub-sound generator 660 outputs sound by vibrating the display panel 110 in response to the sixth sub-sound driving signal SSDS6, the ninth sub-sound generator 690 outputs sound by vibrating the display panel 110 in response to the ninth sub-sound driving signal SSDS9, and the tenth sub-sound generator 700 outputs sound by vibrating the display panel 110 in response to the tenth sub-sound driving signal SSDS10.

Accordingly, in the fifth directional mode, the display device 10 may output sound primarily forward from the fourth side of the display device 10 as illustrated in FIG. 13E. This may effectively reduce the level of unwanted sound arriving at locations other than the region opposing the fourth side of the display panel 110, such as outside the X-Y periphery of the display panel 110 where persons disinterested in the sound may be present.

In the fourth directional mode, each of the first, second, fifth, sixth, ninth and tenth sub-sound generators 610, 620, 650, 660, 690 and 700 may output a sound wave (e.g., an opposite-phase sound wave) that can cancel out sound travelling in a direction other than the direction forward from the third side of the display device 10 among the sound output by the first main sound generator 510 and the sound output by the second main sound generator 520. In addition, in the fifth directional mode, each of the first through fourth, seventh and eighth sub-sound generators 610 through 640, 670 and 680 may output a sound wave (e.g., an opposite-phase sound wave) that can cancel out sound travelling in a direction other than the direction forward from the fourth side of the display device 10 among the sound output by the first main sound generator 510 and the sound output by the second main sound generator 520.

In FIG. 12, a case where the display device 10 determines the position of a user based on an image captured by the camera sensor 200 and controls a plurality of sound generators in any one of the first through fifth directional modes according to the position of the user has been mainly described. However, in other embodiments or operating modes, instead of determining a directional mode based on the camera sensor detection, and the display device 10 may control the sound generators in any one of the first through fifth directional modes according to a sound output position manually set by the user using a remote control.

According to the embodiment illustrated in FIG. 12, a determination of which ones of the sound generators will be activated to output sound is made according to the directional mode. Therefore, the display device 10 may output sound in a specific direction, e.g., with maximum sound energy directed towards a target location, according to the directional mode.

When determining, based on an image captured by the camera sensor 200, that a plurality of users are located in regions opposing more than one of the center, the first side, the second side, the third side and the fourth side of the display device 10, the system on chip 180 may control the sound generators by combining at least two of the first through fifth directional modes. For example, when a plurality of users are located in front of the first side and the third side of the display device 10, sound may be output by the first main sound generator 510, the second main sound generator 520, the first sub-sound generator 610, the third sub-sound generator 630, the fourth sub-sound generator 640, the fifth sub-sound generator 650, the seventh sub-sound generator 670 and the eighth sub-sound generator 680 according to the second directional mode and the fourth directional mode.

In addition, when determining, based on an image captured by the camera sensor 200, that at least one of a plurality of users is located opposing each of the center, the first side, the second side, the third side and the fourth side of the display device 10, the system-on-a-chip 180 may control the sound generators in the non-directional mode. In the non-directional mode, all of the sound generators 510-520, 610-700 may output sound.

Figure 15:
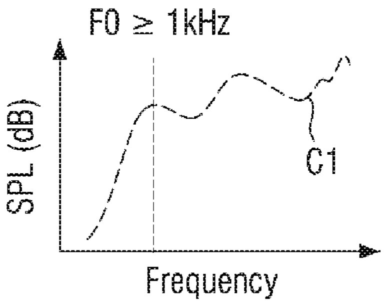
FIG. 15 is a graph illustrating example sound pressure level versus frequency of a main sound generator according to an embodiment.

As mentioned earlier, the frequency response characteristics may be substantially the same for each of the sound generators 510-520 and 610-700 in some embodiments, and may differ in other embodiments. In the former case, the sound pressure level of the sound output by each of the sound generators according to frequency may be substantially the same. For example, FIG. 15 is a graph showing sound pressure level (SPL) vs. frequency of an applied sound signal, for an example sound generator. In this example, the sound generator may output sound having a fundamental frequency (F0) of 1 kHz or more. F0 may be understood as a lowest frequency vibrational mode of the sound generator. More precisely, F0 may indicate a minimum frequency at which the vibration displacement of the display panel 110 vibrated by a sound generator becomes larger than a reference displacement. When the value of F0 associated with a given sound generator is relatively high, the band of frequencies capable of being output by that sound generator is correspondingly high. In an embodiment, each of the sound generators 510-520 and 610-700 may have substantially the same frequency response characteristic, such as that of FIG. 15.

Figure 16A:
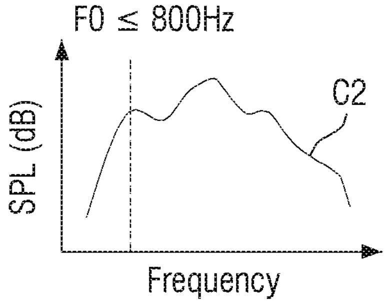
FIG. 16A is a graph illustrating example sound pressure level of sound of a sub-sound generator according to frequency, according to an embodiment.

In another embodiment, each of the main sound generators 510-520 may have the same, first frequency response characteristic, and each of the sub-sound generators 610-700 may have the same, second frequency response characteristic that differs from the first frequency response characteristic. FIG. 16A illustrates another example of a frequency response characteristic for a sound generator, in which the fundamental frequency F0 is 800 Hz or less. In an embodiment, each of the main sound generators 510-520 may output sound having an F0 of 1 kHz or more as illustrated in FIG. 15, and each of the sub-sound generators 610-700 may output sound having an F0 of 800 Hz or less as illustrated in FIG. 16A. Accordingly, the main sound generators 510-520 have higher sound pressure levels in a high-frequency region HRF than the sub-sound generators 610-700. In addition, the sub-sound generators 610-700 have higher sound levels in a low-frequency region LFR than the main sound generators 510-520. Therefore, each of the sub-sound generators 610-700 may be suitable for realizing low-pitched sound as compared with each of the main sound generators 510-520.

Figure 16B:
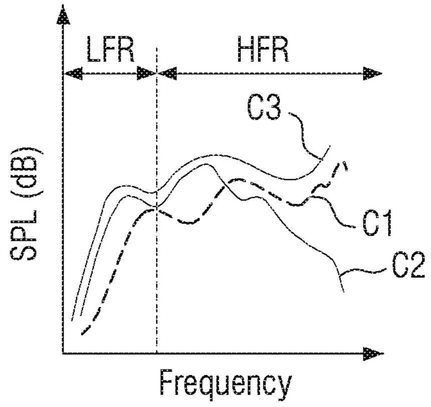
FIG. 16B is a graph illustrating example sound pressure level of sound vs. frequency, which is obtained by adding the sound of the main sound generator and the sound of the sub-sound generator, according to an embodiment.

Ultimately, when the sound of the high-frequency region HFR is output by the main sound generators 510-520 as represented by a curve C1 of FIG. 16B and when the sound of the low-frequency region LFR is output by the sub-sound generators 610-700 as represented by a curve C2 of FIG. 16B, the frequency band of sound to be provided to a user can be extended from a low-frequency band to a high-frequency band as represented by a curve C3 of FIG. 16B. Therefore, a richer sound can be provided to the user.

Figure 17:
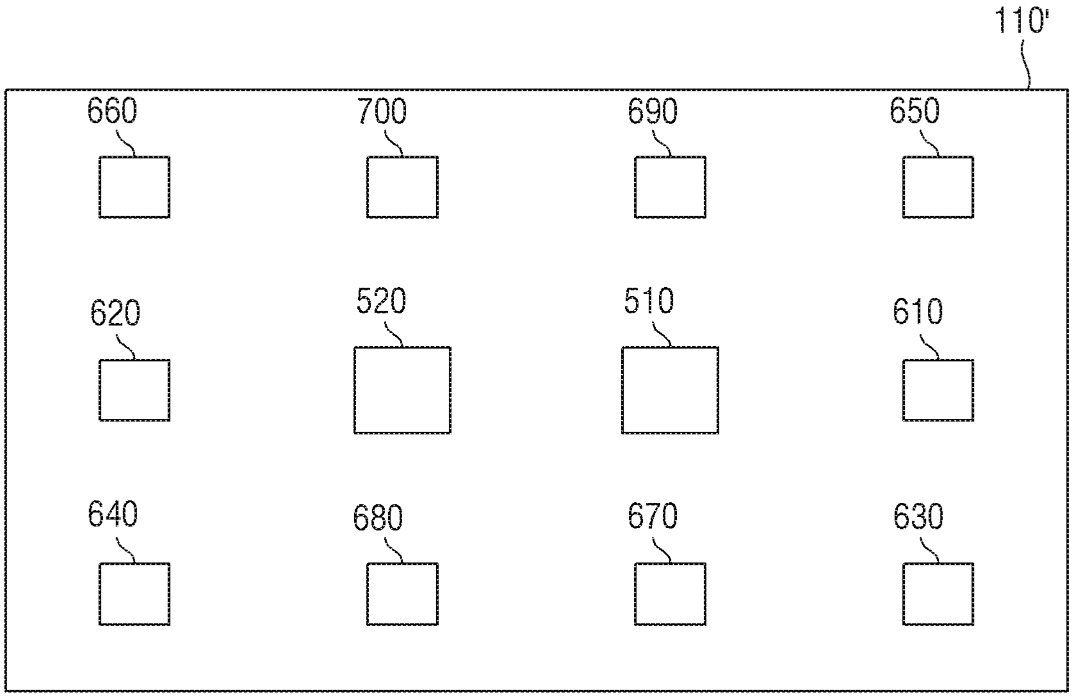
FIG. 17 is a bottom view illustrating an example of the display panel illustrated in FIG. 2.

Alternatively, each of the sound generators 510-520, 610-700 may output sound having an F0 of 1 kHz or more as illustrated in FIG. 15, and an additional sub-sound generator (not shown) may output sound having an F0 of 800 Hz or less as illustrated in FIG. 16A. In this case, the additional sub-sound generator may be set to always output low-pitched sound irrespective of the activation of any first through fifth directional modes. Accordingly, when the sound of the high-frequency region HFR is output by the sound generators 510-520, 610-700 as represented by the curve C1 of FIG. 16B and the sound of the low-frequency region LFR is output by the additional sub-sound generator as represented by the curve C2, the composite frequency characteristic of the curve C3 may be likewise realized FIG. 17 is a bottom view illustrating another example of a display panel, 110', that may be employed in the display device 10. Display panel 110' differs from display panel 110 illustrated in FIGS. 2 and 3 in that the size of each main sound generator 510, 520 (as determined by planar area) is larger than that of respective sub-sound generators 610-700. (In the embodiment of FIG. 3, the sizes of each of the sound generators 510-520, 610-700, as determined by planar area, are substantially equal. In addition, it may be assumed that thicknesses of the sound generators may be substantially independent of their planar areas in display panels 110 and 110'.) Display panel 110' may include similar or identical flexible films 122, a source circuit board 140, flexible cables 150, a control circuit board 160, a first flexible circuit board 710, a second flexible circuit board 720, etc., as described above for display panel 110.

With display panel 110', the first main sound generator 510 and the second main sound generator 520 serve as main speakers that always output sound regardless of which sound directional mode is activated. For instance, it may be desirable for the volume of sound output from each of the main sound generators 510-520 to be greater than the volume of sound output from each of the sub-sound generators 610-700. When the sound generators 510-520, 610-700 are piezo actuators, the volume of the maximum sound output by a sound generator may increase as the size of the sound generator increases. Therefore, when the size of each main sound generator 510, 520 is larger than that of each of the sub-sound generators 610-700, as illustrated in FIG. 17, the volume of the sound output from the main sound generators 510, 520 may be greater than that output by the respective sub sound generators 610-700 (when the same electrical sound signal is applied to each).

Figure 18:
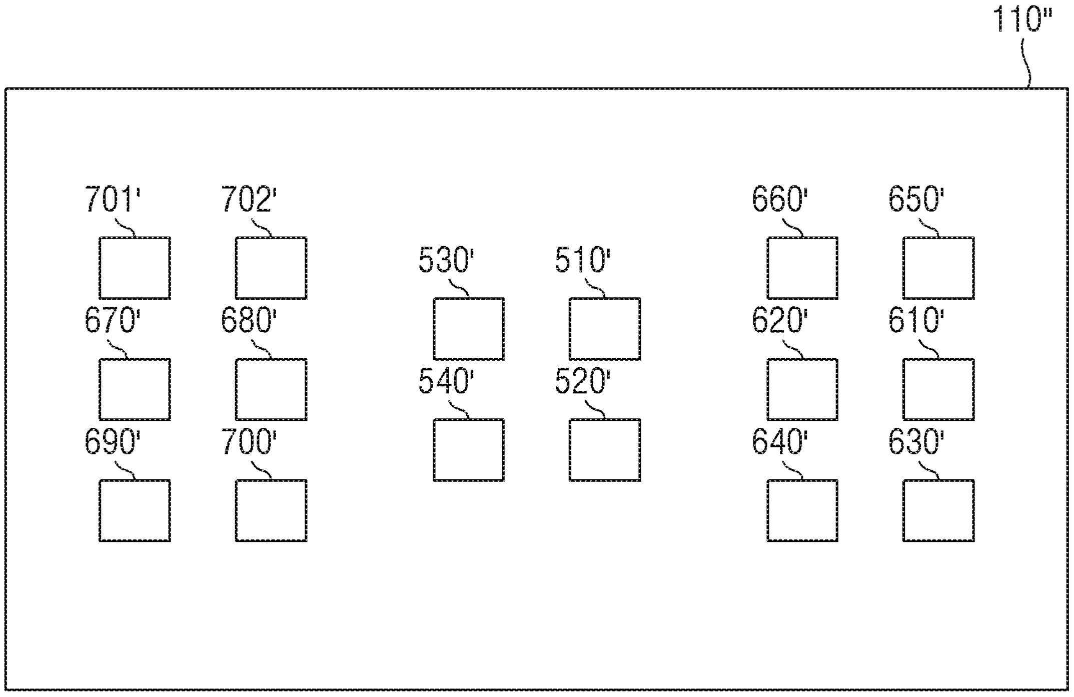
FIG. 18 is a bottom view illustrating an example of the display panel illustrated in FIG. 2.

FIG. 18 is a bottom view illustrating a further example of a display panel, 110", that may be included within display device 10. Display panel 110" may include similar or identical flexible films 122, a source circuit board 140, flexible cables 150, a control circuit board 160, a first flexible circuit board 710, and a second flexible circuit board 720 (not shown in FIG. 18) to those described above, but the description thereof is omitted for ease of description.

Display panel 110" may differ from display panel 110 illustrated in FIG. 3 by including four main sound generators 510', 520', 530' and 540' (hereafter, 510'-540') and twelve sub-sound generators 610', 620', 630', 640', 650', 660', 670', 680', 690', 701' and 702' (hereafter, 610'-702'). In FIG. 18, a description of elements and features identical to those of the embodiment illustrated in FIG. 3 will be omitted.

The main sound generators 510'-540' may be disposed at the center of display panel 110", and the sub-sound generators 610'-702' may be located on the first side and the second side of the display panel 110". A gap between main sound generators adjacent to each other and a gap between sub-sound generators adjacent to each other may be smaller than a gap between a main sound generator and a sub-sound generator adjacent to each other. In this case, the directivity of sound output by the main sound generators 510'-540' (collectively, as a speaker array) may be higher in a direction forward from the center of the display device 10 as compared to display device 110 of FIG. 3. (Sound directivity is known to be positively correlated with the overall aperture size of a speaker or speaker array.) In addition, the directivity of sound output by the sub-sound generators 610' through 660' disposed on the first side may be higher in a direction forward from the first side of display panel 110" than that for display panel 110, and the directivity of sound output by the sub-sound generators 670' through 700', 701' and 702' disposed on the second side may be higher in a direction forward from the second side of display panel 110" than that for display panel 110.

Accordingly, with display panel 110", interference, if any, between the sound output by the main sound generators 510' through 540' and the sound output by the sub-sound generators 610' through 660' disposed on the first side may be less than that for display panel 110. In addition, any interference between the sound output by the main sound generators 510' through 540' and the sound output by the sub-sound generators 670'-701' disposed on the second side may be less than that for display panel 110.

Figure 19:
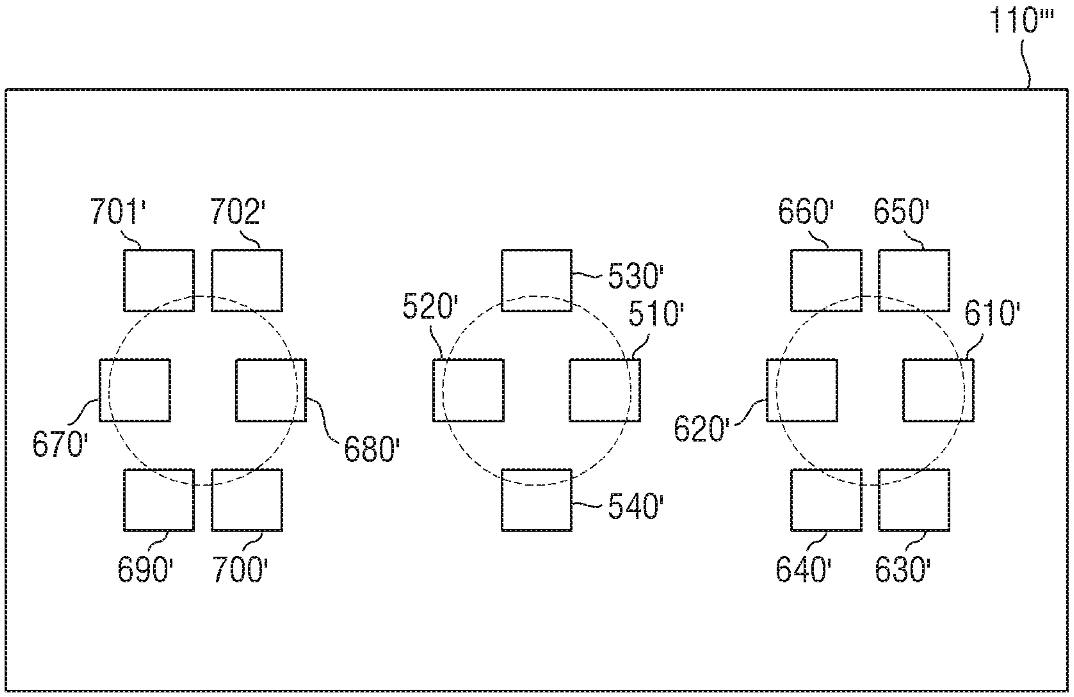
FIG. 19 is a bottom view illustrating an example of the display panel illustrated in FIG. 2.

In FIG. 18, the main sound generators 510' through 540', the sub-sound generators 610 through 660' disposed on the first side, and the sub-sound generators 670'-702' disposed on the second side are arranged in a quadrilateral shape when seen in plan view. However, other geometric layouts are available. For example, as illustrated in FIG. 19, another example of a display panel, 110'", may include the main sound generators 510' through 540', the sub-sound generators 610' through 660' disposed on the first side, and the sub-sound generators 670' through 700', 701' and 702' disposed on the second side may also be arranged in a generally circular, elliptical or diamond shape when seen in plan view. In this case, the directivity of the sound output by the main sound generators 510' through 540', the directivity of the sound output by the sub-sound generators 610' through 660' disposed on the first side, and the directivity of the sound output by the sub-sound generators 670'-702' disposed on the second side can be further increased.

Figure 20:
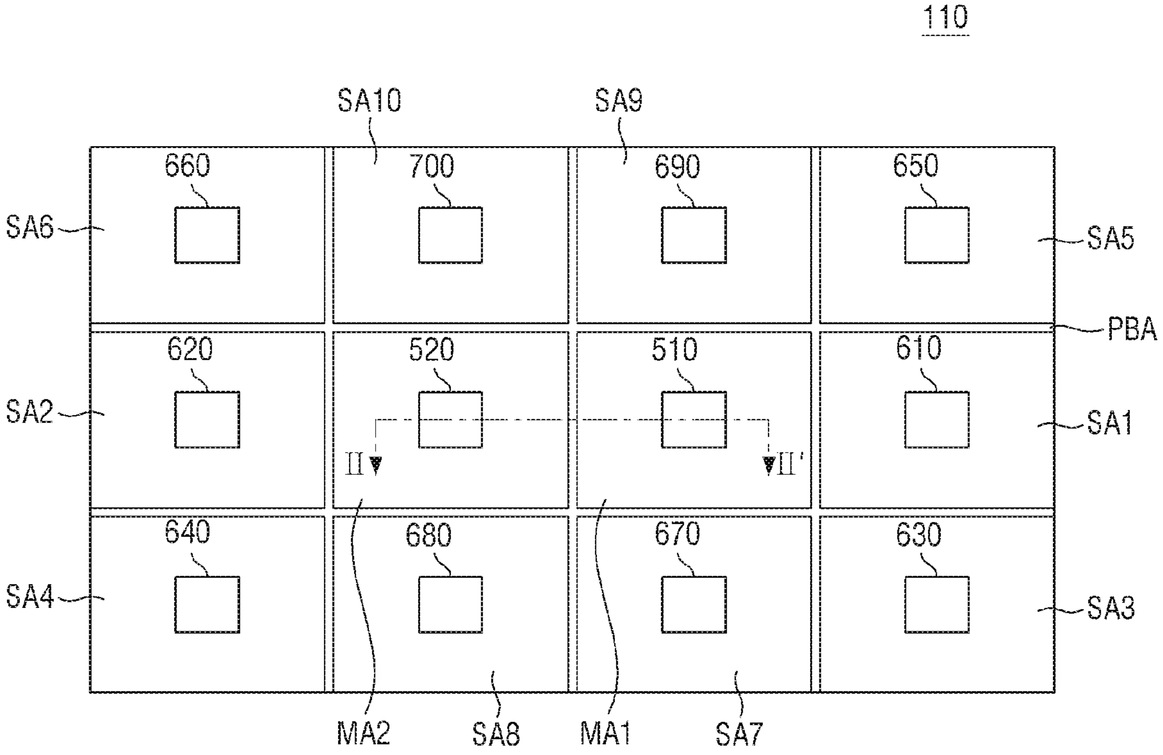
FIG. 20 is a bottom view illustrating an example of the display panel illustrated in FIG. 2.

FIG. 20 is a bottom view illustrating an example of the display panel 110 illustrated in FIG. 2. In FIG. 20, flexible films 122, a source circuit board 140, flexible cables 150, a control circuit board 160, a first flexible circuit board 710, and a second flexible circuit board 720 are omitted for ease of description.

Display panel 110 illustrated in FIG. 20 is different from the embodiment illustrated in FIG. 3 in that the display device 110 is divided into two main vibration areas MA1 and MA2 and ten sub-vibration areas SA1 through SA10 by a propagation blocking area PBA. In FIG. 20, a description of elements and features identical to those of the embodiment illustrated in FIG. 3 will be omitted.

As shown in FIG. 20, an area where a first main sound generator 510 is disposed may be defined as a first main vibration area MA1, and an area where a second main sound generator 520 is disposed may be defined as a second main vibration area MA2. In addition, areas where first through tenth sub-sound generators 610 through 700 are disposed may be defined as first through tenth sub-vibration areas SA1 through SA10, respectively.

The propagation blocking area PBA may be collectively disposed between adjacent vibration areas MA1, MA2, SA1, SA2, SA3, SA4, SA5, SA6, SA7, SA8, SA9 and SA10. For example, respective portions of propagation blocking area PBA may be disposed between the first main vibration area MA1 and the second main vibration area MA2, between the first main vibration area MA1 and the first sub-vibration area SA1, between the first main vibration area MA1 and the seventh sub-vibration area SA7, and between the first main vibration area MA1 and the ninth sub-vibration area SA9. In addition, respective portions of the propagation blocking area PBA may be disposed between the second main vibration area MA2 and the second sub-vibration area SA2, between the second main vibration area MA2 and the eighth sub-vibration area SA8, and between the second main vibration area MA2 and the tenth sub-vibration area SA10. Respective portions of the propagation blocking area PBA may also be disposed between the first sub-vibration area SA1 and the third sub-vibration area SA3, between the first sub-vibration area SA1 and the fifth sub-vibration area SA5, between the second sub-vibration area SA2 and the fourth sub-vibration area SA4, and between the second sub-vibration area SA2 and the sixth sub-vibration area SA6.

The propagation blocking area PBA serves to block vibrations generated by a sound generator in one vibration area from propagating to other vibration areas. To this end, the propagation blocking area PBA may include or be composed of a medium different from mediums of the main vibration areas MA1 and MA2 and mediums of the sub-vibration areas SA1 through SA10. Here, the propagation of vibrations is proportional to the density and propagation speed of a medium. Therefore, if the propagation blocking area PBA is filled with air or a low-density medium, it can prevent vibrations generated by a sound generator in one vibration area from propagating to other vibration areas. The propagation blocking area PBA will be described in detail later with reference to FIGS. 21, 23 and 24.

According to the embodiment illustrated in FIG. 20, areas in which sound generators are disposed may be defined as the vibration areas MA1, MA2 and SA1 through SA10, respectively, and the propagation blocking area PBA may be disposed between adjacent vibration areas MA1, MA2, SA1, SA2, SA3, SA4, SA5, SA6, SA7, SA8, SA9 and SA10. In this case, the propagation blocking area PBA can prevent vibrations generated by a sound generator in one vibration area from propagating to other vibration areas. Therefore, it is possible to prevent a sound generator in one vibration area from affecting the sound output of sound generators in other vibration areas.

Figure 21:
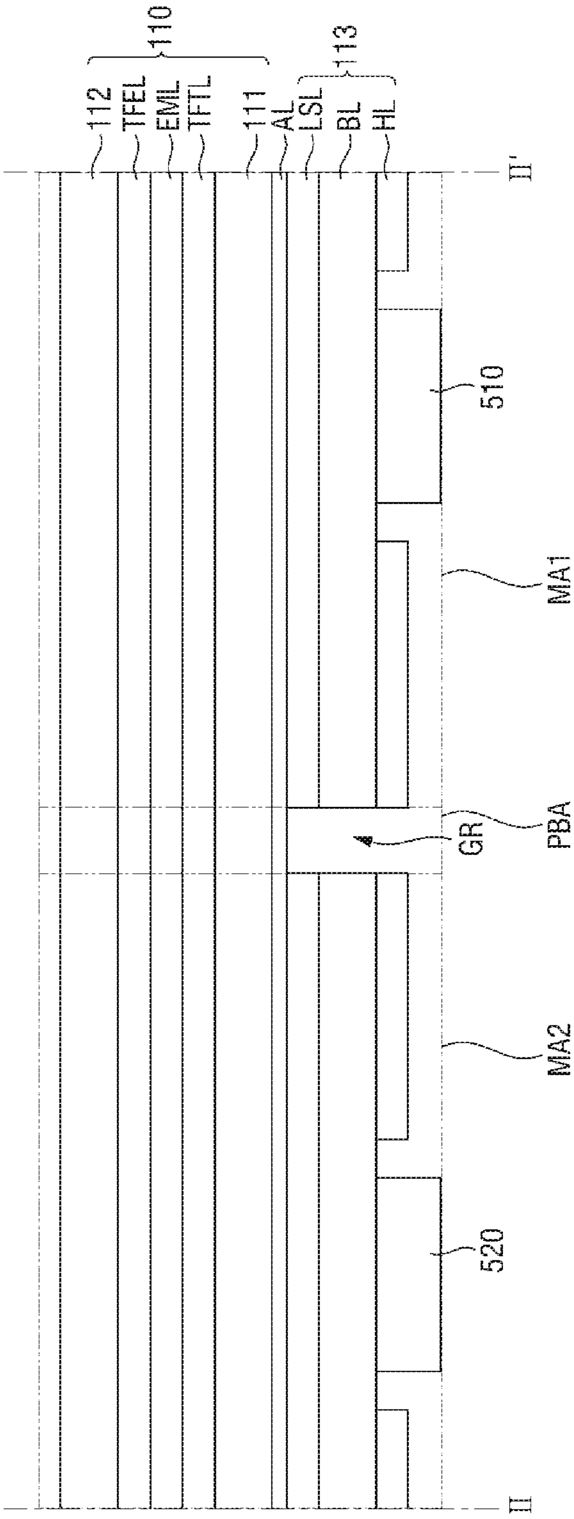
FIG. 21 is a cross-sectional view illustrating an example cross section along lines II-II' of FIG. 20.
Figure 22:
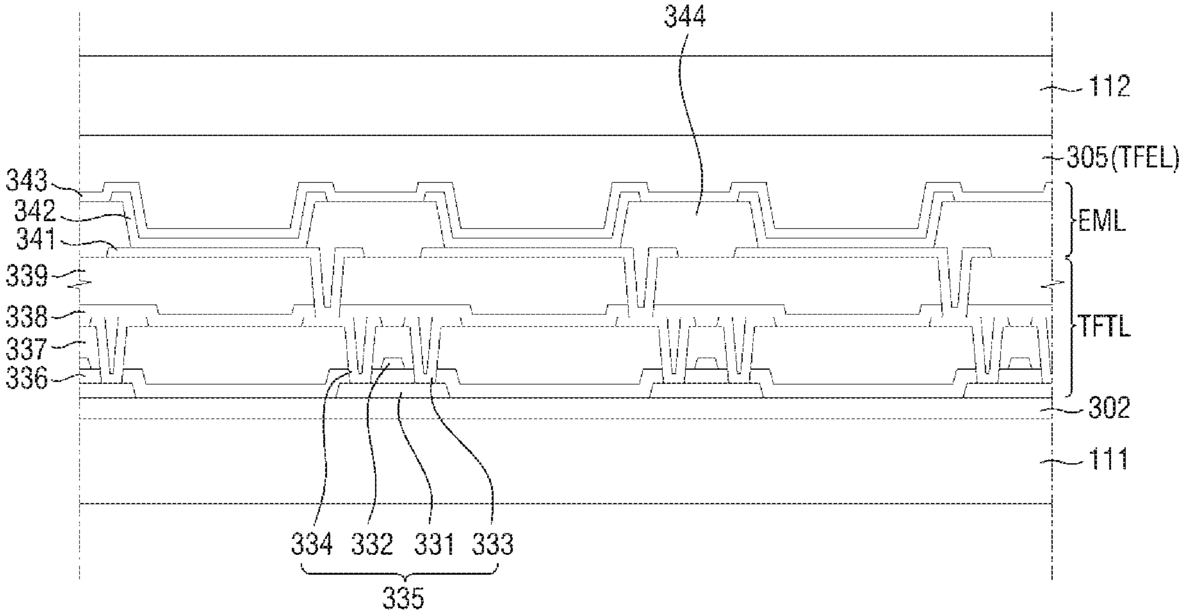
FIG. 22 is an enlarged cross-sectional view illustrating a display panel of FIG. 21 in detail.

FIG. 21 is a cross-sectional view illustrating an example of II-II' of FIG. 20. FIG. 22 is an enlarged cross-sectional view illustrating a display panel 110 of FIG. 21 in detail.

Referring to FIGS. 21 and 22, the display device 10 includes the display panel 110, an under-panel member 113 disposed under the display panel 110, and an adhesive layer AL which bonds the display panel 110 and the under-panel member 113 together.

The display panel 110 may include a lower substrate 111, an upper substrate 112, a thin-film transistor TFTL, a light emitting element layer EML, and a thin-film encapsulation layer TFEL.

A buffer layer 302 may be formed on the lower substrate 111. The buffer layer 302 may be formed on the lower substrate 111 to protect thin-film transistors 335 and light emitting elements from moisture introduced through the lower substrate 111 which is vulnerable to moisture penetration. The buffer layer 302 may be composed of a plurality of inorganic layers stacked alternately. For example, the buffer layer 302 may be a multilayer structure in which one or more inorganic layers selected from a silicon oxide (SiOx) layer, a silicon nitride (SiNx) layer, and SiON are alternately stacked. It is noted that the buffer layer 302 can be omitted.

The thin-film transistor layer TFTL is formed on the buffer layer 302. The thin-film transistor layer TFTL includes the thin-film transistors 335, a gate insulating layer 336, an interlayer insulating film 337, a protective layer 338, and a planarization layer 339.

The thin-film transistors 335 are formed on the buffer layer 302. Each of the thin-film transistors 335 includes an active layer 331, a gate electrode 332, a source electrode 333, and a drain electrode 334. In FIG. 22, each of the thin-film transistors 335 is formed as a top-gate type in which the gate electrode 332 is located above the active layer 331. However, it should be noted that the present disclosure is not limited to this case. That is, each of the thin-film transistors 335 may also be formed as a bottom-gate type in which the gate electrode 332 is located under the active layer 331 or a double-gate type in which the gate electrode 332 is located both above and under the active layer 331.

The active layers 331 are formed on the buffer layer 302. The active layers 331 may be made of a silicon-based semiconductor material or an oxide-based semiconductor material. A light shielding layer may be formed between the buffer layer 302 and the active layers 331 to block external light from entering the active layers 331.

The gate insulating layer 336 may be formed on the active layers 331. The gate insulating layer 336 may be an inorganic layer, for example, a SiOx layer, a SiNx layer, or a multilayer composed of these layers.

The gate electrodes 332 and gate lines may be formed on the gate insulating layer 336. Each of the gate electrodes 332 and the gate lines may be a single layer or a multilayer made of any one or more of molybdenum (Mo), aluminum (Al), chromium (Cr), gold (Au), titanium (Ti), nickel (Ni), neodymium (Ne), copper (Cu), and alloys of these metals.

The interlayer insulating film 337 may be formed on the gate electrodes 332 and the gate lines. The interlayer insulating film 337 may be an inorganic layer, for example, a SiOx layer, a SiNx layer, or a multilayer composed of these layers.

The source electrodes 333, the drain electrodes 334, and data lines may be formed on the interlayer insulating film 337. Each of the source electrodes 333 and the drain electrodes 334 may be connected to an active layer 331 through a contact hole penetrating the gate insulating layer 336 and the interlayer insulating film 337. Each of the source electrodes 333, the drain electrodes 334 and the data lines may be a single layer or a multilayer made of any one or more of Mo, Al, Cr, Au, Ti, Ni, Ne, Cu, and alloys of these metals.

The protective layer 338 for insulating the thin-film transistors 335 may be formed on the source electrodes 333, the drain electrodes 334, and the data lines. The protective layer 338 may be an inorganic layer, for example, a SiOx layer, a SiNx layer, or a multilayer composed of these layers.

The planarization layer 339 may be formed on the protective layer 338 to flatten steps due to the thin-film transistors 335. The planarization layer 339 may be made of an organic layer such as acryl resin, epoxy resin, phenolic resin, polyamide resin, or polyimide resin.

The light emitting element layer EML is formed on the thin-film transistor layer TFTL. The light emitting element layer EML includes light emitting elements and a pixel defining layer 344.

The light emitting elements and the pixel defining layer 344 are formed on the planarization layer 339. The light emitting elements may be organic light emitting elements. In this case, each of the light emitting elements may include an anode 341, a light emitting layer 342, and a cathode 343.

The anodes 341 may be formed on the planarization layer 339. The anodes 341 may be connected to the source electrodes 333 or the drain electrodes 334 of the thin-film transistors 335 through contact holes penetrating the protective layer 338 and the planarization layer 339.

The pixel defining layer 344 may be formed on the planarization layer 339 and may cover edges of the anodes 341 to define pixels. That is, the pixel defining layer 344 serves as a pixel defining layer for defining pixels. Each of the pixels is an area in which the anode 341, the light emitting layer 342 and the cathode 343 are sequentially stacked so that holes from the anode 341 and electrons from the cathode 343 combine together in the light emitting layer 342 to emit light.

The light emitting layers 342 are formed on the anodes 341 and the pixel defining layer 344. The light emitting layers 342 may be organic light emitting layers. Each of the light emitting layers 342 may emit one of red light, green light, and blue light. The red light may have a peak wavelength range of about 620 nm to about 750 nm, and the green light may have a peak wavelength range of about 495 nm to about 570 nm. In addition, the blue light may have a peak wavelength range of about 450 nm to about 495 nm. Alternatively, the light emitting layers 342 may be white light emitting layers that emit white light. In this case, the light emitting layers 342 may each be a stack of a red light emitting layer, a green light emitting layer and a blue light emitting layer and may collectively be a common layer common to all pixels. In this case, the display panel 110 may further include color filters for displaying red, green, and blue.

Each of the light emitting layers 342 may include a hole transporting layer, a light emitting layer, and an electron transporting layer. In addition, each of the light emitting layers 342 may be formed in a tandem structure of two stacks or more, in which case a charge generating layer may be formed between the stacks.

The cathode 343 is formed on the light emitting layers 342. The cathode 343 may be formed to cover the light emitting layers 342. The cathode 343 may be a common layer common to all pixels.

When the light emitting element layer EML is formed as a top emission type which emits light upward, the anodes 341 may be made of a metal material having high reflectivity, such as a stacked structure (Ti/Al/Ti) of Al and Ti, a stacked structure (ITO/Al/ITO) of Al and indium tin oxide (ITO), an APC alloy, or a stacked structure (ITO/APC/ITO) of an APC alloy and ITO. The APC alloy is an alloy of Ag, Pd, and Cu. In addition, the cathode 343 may be made of a transparent conductive material (TCO) capable of transmitting light, such as ITO or indium zinc oxide (IZO), or a semi-transmissive conductive material such as magnesium (Mg), Ag or an alloy of Mg and Ag. When the cathode 343 is made of a semi-transmissive conductive material, the light emission efficiency may be increased by a microcavity.

When the light emitting element layer EML is formed as a bottom emission type which emits light downward, the anodes 341 may be made of a TCO capable of transmitting light, such as ITO or IZO, or a semi-transmissive conductive material such as Mg, Ag or an alloy of Mg and Ag. The cathode 343 may be made of a metal material having high reflectivity, such as a stacked structure (Ti/Al/Ti) of Al and Ti, a stacked structure (ITO/Al/ITO) of Al and ITO, an APC alloy, or a stacked structure (ITO/APC/ITO) of an APC alloy and ITO. When the anodes 341 are made of a semi-transmissive conductive material, the light emission efficiency may be increased by a microcavity.

The thin-film encapsulation layer TFEL (305) is formed on the light emitting element layer EML. The thin-film encapsulation layer TFEL (305) serves to prevent oxygen or moisture from permeating the light emitting layers 342 and the cathode 343. To this end, the thin-film encapsulation layer TFEL (305) may include at least one inorganic layer. The inorganic layer may be made of silicon nitride, aluminum nitride, zirconium nitride, titanium nitride, hafnium nitride, tantalum nitride, silicon oxide, aluminum oxide, or titanium oxide. In addition, the thin-film encapsulation layer TFEL (305) may further include at least one organic layer. The organic layer may be formed to a sufficient thickness to prevent particles from penetrating the thin-film encapsulation layer TFEL (305) and entering the light emitting layers 342 and the cathode 343. The organic layer may include any one of epoxy, acrylate, and urethane acrylate.

The under-panel member 113 may be disposed under the display panel 110. The under-panel member 113 may be attached to the lower surface of the display panel 110 by the adhesive layer AL. The adhesive layer AL may be an optically clear adhesive (OCA) film or an optically clear resin (OCR).

The under-panel member 113 may include a light absorbing member LSL for absorbing light incident from the outside, a buffer member BL for absorbing external impact, and a heat dissipating member HL for efficiently dissipating the heat of the display panel 110.

The light absorbing member LSL may be disposed under the display panel 110. The light absorbing member LSL blocks transmission of light to prevent elements disposed under the light absorbing member LSL, that is, the sound generators, the flexible films 122, the source circuit boards 140, the flexible cables 150, the control circuit board 160, etc. from being seen from above the display panel 110. The light absorbing member LSL may include a light absorbing material such as a black pigment or dye.

The buffer member BL may be disposed under the light absorbing member LSL. The buffer member BL is a cushion layer and absorbs external impact to prevent the display panel 110 from being damaged. The buffer member BL may be a single layer or a multilayer. For example, the buffer member BL may be made of a polymer resin such as polyurethane, polycarbonate, polypropylene or polyethylene or may be made of an elastic material such as a sponge formed by foaming a rubber, a urethane-based material or an acrylic-based material.

The heat dissipating member HL may be disposed under the buffer member BL. The heat dissipating member HL may include a first heat dissipating layer containing graphite or carbon nanotubes and a second heat dissipating layer capable of shielding electromagnetic waves and made of a metal thin layer having high thermal conductivity, such as copper, nickel, ferrite or silver.

If the first main sound generator 510, the second main sound generator 520 and the first through tenth sub-sound generators 610 through 700 ("sound generators 510-520, 610-700") are disposed on the heat dissipating member HL, the first heat dissipating layer or the second heat dissipating layer of the heat dissipating member HL can be broken by the vibration of sound generators 510-520, 610-700. Therefore, the heat dissipating member HL may be excluded from (e.g., portions thereof were removed from) areas where sound generators 510-520, 610-700 are disposed. As a result, sound generators 510-520, 610-700 do not overlap the heat dissipating member HL. Therefore, sound generators 510-520, 610-700 may be disposed on the buffer member BL.

Alternatively, the under-panel member 113 may be excluded from (e.g. were removed from) the areas where sound generators 510-520, 610-700 are disposed. In this case, sound generators 510-520, 610-700 may be disposed on the lower surface of the display panel 110.

Sound generators 510-520, 610-700 may be attached to the buffer member BL or the lower surface of the display panel 110 by an adhesive member. The adhesive member may be a pressure sensitive adhesive (PSA).

When sound generators 510-520, 610-700 are disposed on the buffer member BL, the light absorbing member LSL, the buffer member BL and the heat dissipating member HL of the under-panel member 113 may serve as mediums through which vibrations generated by sound generators 510-520, 610-700 are propagated. If the light absorbing member LSL, the buffer member BL and the heat dissipating member HL of the under-panel member 113 are excluded from (e.g. were removed from) the propagation blocking area PBA, a groove GR may be formed in the propagation blocking area PBA as a result of the removal of the light absorbing member LSL, the buffer member BL and the heat dissipating member HL of the under-panel member 113. That is, the light absorbing member LSL, the buffer member BL and the heat dissipating member HL of the under-panel member 113 may be discontinuous in the propagation blocking area PBA. Since this reduces the densities of the light absorbing member LSL, the buffer member BL and the heat dissipating member HL of the under-panel member 113 in the propagation blocking area PBA, vibrations generated by the first main sound generator 510 disposed in the first main vibration area MA1 can be prevented from propagating through the light absorbing member LSL, the buffer member BL and the heat dissipating member HL of the under-panel member 113. In addition, vibrations generated by the second main sound generator 520 disposed in the second main vibration area MA2 can be prevented from propagating through the light absorbing member LSL, the buffer member BL and the heat dissipating member HL of the under-panel member 113.

According to the embodiment illustrated in FIG. 21, the groove GR is formed in the propagation blocking area PBA disposed between adjacent vibration areas MA1, MA2, SA1, SA2, SA3, SA4, SA5, SA6, SA7, SA8, SA9 and SA10 by removing the light absorbing member LSL, the buffer member BL and the heat dissipating member HL of the under-panel member 113 through which vibrations generated by a sound generator are propagated. In this case, vibrations generated by a sound generator in one vibration area can be prevented from propagating to other vibration areas. Therefore, it is possible to prevent a sound generator in one vibration area from affecting the sound output of sound generators in other vibration areas.

Figure 23:
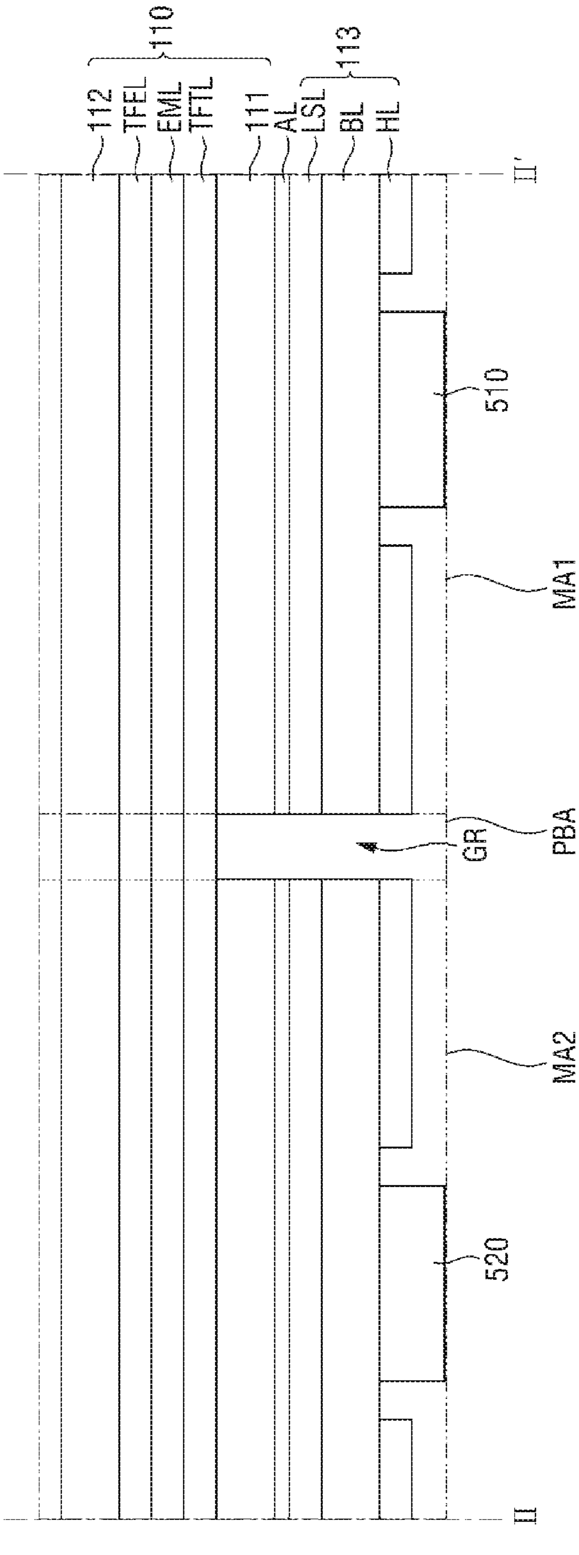
FIG. 23 is a cross-sectional view illustrating an example of II-II' of FIG. 20.

FIG. 23 is a cross-sectional view illustrating an example of II-II' of FIG. 20.

The embodiment illustrated in FIG. 23 differs from the embodiment illustrated in FIG. 21 in that not only a light absorbing member LSL, a buffer member BL and a heat dissipating member HL of an under-panel member 113 but also an adhesive layer AL and a lower substrate 111 are excluded from (e.g. were removed from) a propagation blocking area PBA. In FIG. 23, redundant description of elements and features discussed for FIG. 21 will be omitted.

Referring to FIG. 23, a groove GR is formed in the propagation block area PBA by removing the lower substrate 111, the adhesive layer AL, and the light absorbing member LSL, the buffer member BL and the heat dissipating member HL of the under-panel member 113. Therefore, it is possible to prevent vibrations generated by a first main sound generator 510 disposed in a first main vibration area MA1 from propagating to a second main vibration area MA2 through the lower substrate 111, the adhesive layer AL, and the under-panel member 113. In addition, it is possible to prevent vibrations generated by a second main sound generator 520 disposed in the second main vibration area MA2 from propagating to the first main vibration area MA1 through the lower substrate 111, the adhesive layer AL, and the under-panel member 113.

According to the embodiment illustrated in FIG. 23, since the adhesive layer AL and the lower substrate 111 are additionally excluded from (e.g. were removed from) the propagation blocking area PBA as compared with FIG. 21, the propagation blocking area PBA can further prevent vibrations generated by a sound generator in one vibration area from propagating to other vibration areas.

Figure 24:
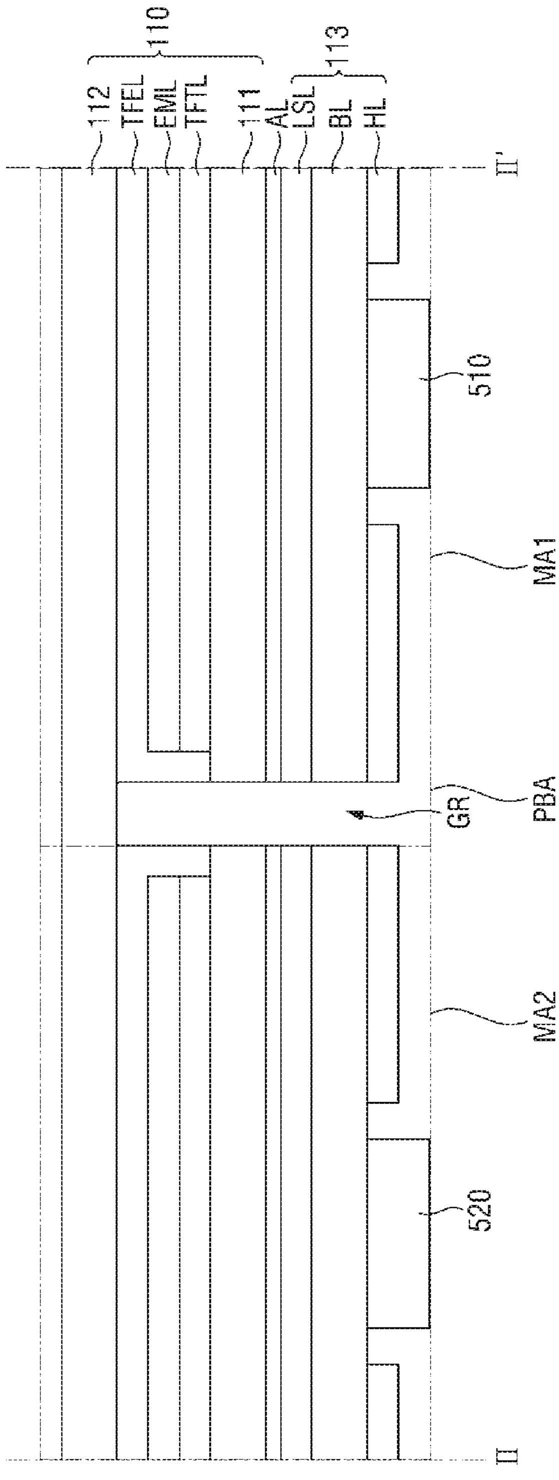
FIG. 24 is a cross-sectional view illustrating another example of II-II' of FIG. 20.

FIG. 24 is a cross-sectional view illustrating an example of II-II' of FIG. 20.

The embodiment illustrated in FIG. 24 differs from the embodiment illustrated in FIG. 23 in that not only a lower substrate 111, an adhesive layer AL, and a light absorbing member LSL, a buffer member BL and a heat dissipating member HL of an under-panel member 113 but also a thin-film transistor layer TFTL, a light emitting element layer EML and a thin-film encapsulation layer TFEL are excluded from (e.g. were removed from) a propagation blocking area PBA. In FIG. 24, a description of elements and features identical to those of the embodiment illustrated in FIG. 23 will be omitted.

As shown in FIG. 24, a groove GR is formed in the propagation blocking area PBA by removing the lower substrate 111, the thin-film transistor layer TFTL, the light emitting element layer EML and the thin-film encapsulation layer TFEL of a display panel 110, the adhesive layer AL, and the light absorbing member LSL, the buffer member BL and the heat dissipating member HL of the under-panel member 113. Therefore, it is possible to prevent vibrations generated by a first main sound generator 510 disposed in a first main vibration area MA1 from propagating to a second main vibration area MA2 through the lower substrate 111, the thin-film transistor layer TFTL, the light emitting element layer EML and the thin-film encapsulation layer TFEL of the display panel 110, the adhesive layer AL, and the light absorbing member LSL, the buffer member BL and the heat dissipating member HL of the under-panel member 113. In addition, it is possible to prevent vibrations generated by a second main sound generator 520 disposed in the second main vibration area MA2 from propagating to the first main vibration area MA1 through the lower substrate 111, the thin-film transistor layer TFTL, the light emitting element layer EML and the thin-film encapsulation layer TFEL of the display panel 110, the adhesive layer AL, and the light absorbing member LSL, the buffer member BL and the heat dissipating member HL of the under-panel member 113.

According to the embodiment illustrated in FIG. 24, since the thin-film transistor layer TFTL, the light emitting element layer EML and the thin-film encapsulation layer TFEL are additionally excluded from (e.g. were removed from) the propagation blocking area PBA as compared with FIG. 23, the propagation blocking area PBA further prevent vibrations generated by a sound generator in one vibration area from propagating to other vibration areas.

When the thin-film transistor layer TFTL and the light emitting element layer EML are exposed in the propagation blocking area PBA without being covered by the thin-film encapsulation layer TFEL, oxygen or moisture may permeate into light emitting layers 342 and a cathode 343 of the light emitting element layer EML. Therefore, the thin-film encapsulation layer TFEL is formed to cover the thin-film transistor layer TFTL and the light emitting element layer EML in a first main vibration area MA1, a second main vibration area MA2, and first through tenth sub-vibration areas SA1 through SA10. Accordingly, the thin-film encapsulation layer TFEL is exposed in the propagation blocking area PBA. As a result, the thin-film transistor layer TFTL and the light emitting element layer EML can be prevented from being exposed without being covered by the thin-film encapsulation layer TFEL.

Figure 25:
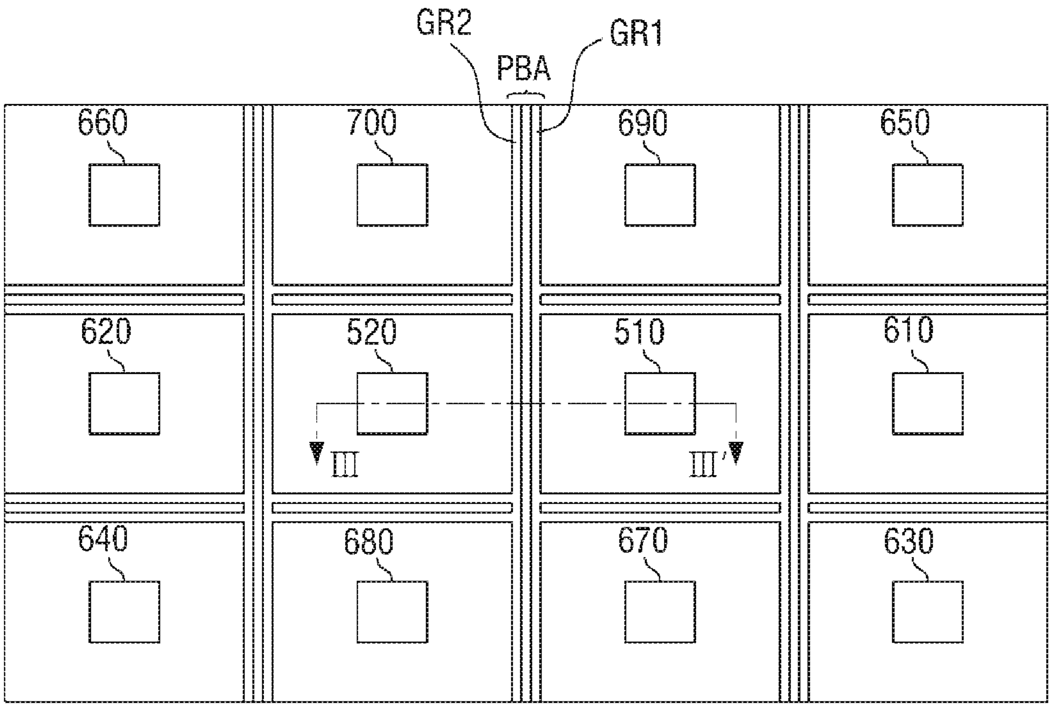
FIG. 25 is a bottom view illustrating an example of the display panel illustrated in FIG. 2.

FIG. 25 is a bottom view illustrating an example of the display panel 110 illustrated in FIG. 2.

In FIG. 25, flexible films 122, a source circuit board 140, flexible cables 150, a control circuit board 160, a first flexible circuit board 710, and a second flexible circuit board 720 are omitted for ease of description.

The embodiment illustrated in FIG. 25 differs from the embodiment illustrated in FIG. 20 in that a plurality of grooves GR1 and GR2 are formed in a propagation blocking area PBA. In FIG. 25, redundant description of elements and features discussed for FIG. 20 will be omitted.

Referring to FIG. 25, a plurality of grooves GR1 and GR2 may be formed in the propagation blocking area PBA. The grooves GR1 and GR2 may be filled with a medium different from mediums of main vibration areas MA1 and MA2 and mediums of sub-vibration areas SA1 through SA10. Here, the propagation of vibrations is proportional to the density and propagation speed of a medium. Therefore, if the grooves GR1 and GR2 are filled with air or a low-density medium, the propagation blocking area PBA can prevent vibrations generated by a sound generator in one vibration area from propagating to other vibration areas. The propagation blocking area PBA will be described in detail later with reference to FIGS. 26 and 27.

Figure 26:
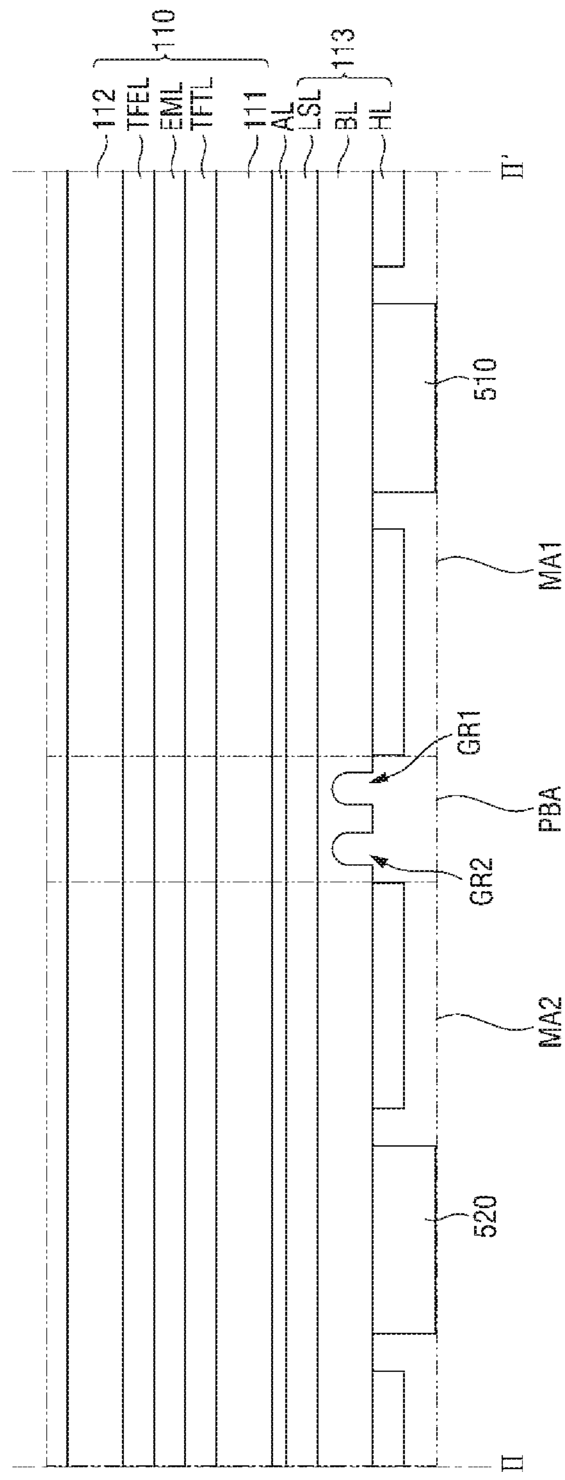
FIG. 26 is a cross-sectional view illustrating an example of III-III' of FIG. 25.

FIG. 26 is a cross-sectional view illustrating an example of III-III' of FIG. 25. As shown in FIG. 26, a display device 10 may include a display panel 110, an under-panel member 113 disposed under the display panel 110, and an adhesive layer AL which bonds the display panel 110 and the under-panel member 113 together.

Since the display panel 110, the adhesive layer AL, and the under-panel member 113 are substantially the same as those described above with reference to FIGS. 21 and 22, a detailed description of the display panel 110, the adhesive layer AL, and the under-panel member 113 will be omitted.

When a first main sound generator 510, a second main sound generator 520, and first through tenth sub-sound generators 610 through 700 are disposed on a buffer member BL, a plurality of concave grooves GR1 and GR2 may be formed in a lower surface of the buffer member BL in the propagation blocking area PBA. That is, a portion of the buffer member BL through which vibrations generated by the first main sound generator 510, the second main sound generator 520 and the first through tenth sub-sound generators 610 through 700 are propagated may be excluded from (e.g. were removed from) the propagation blocking area PBA. Accordingly, the buffer member BL is discontinuous in the propagation blocking area PBA. Since this reduces the density of the buffer member BL in the propagation blocking area PBA, vibrations generated by the first main sound generator 510 disposed in a first main vibration area MA1 can be prevented from propagating through the buffer member BL. In addition, vibrations generated by the second main sound generator 520 disposed in a second main vibration area MA2 can be prevented from propagating through the buffer member BL.

According to the embodiment illustrated in FIG. 26, the concave grooves GR1 and GR2 are formed in the lower surface of the buffer member BL of the under-panel member 113, through which vibrations generated by a sound generator are propagated, in the propagation blocking area PBA disposed between adjacent vibration areas MA1, MA2, SA1, SA2, SA3, SA4, SA5, SA6, SA7, SA8, SA9 and SA10. In this case, vibrations generated by a sound generator in one vibration area can be prevented from propagating to other vibration areas by the propagation blocking area PBA. Therefore, it is possible to prevent a sound generator in one vibration area from affecting the sound output of sound generators in other vibration areas.

If the under-panel member 113 is omitted, the first main sound generator 510, the second main sound generator 520, and the first through tenth sub-sound generators 610 through 700 are disposed on a lower surface of a lower substrate 111. In this case, the concave grooves GR1 and GR2 may be formed in the lower surface of the lower substrate 111 in the propagation blocking area PBA.

Figure 27:
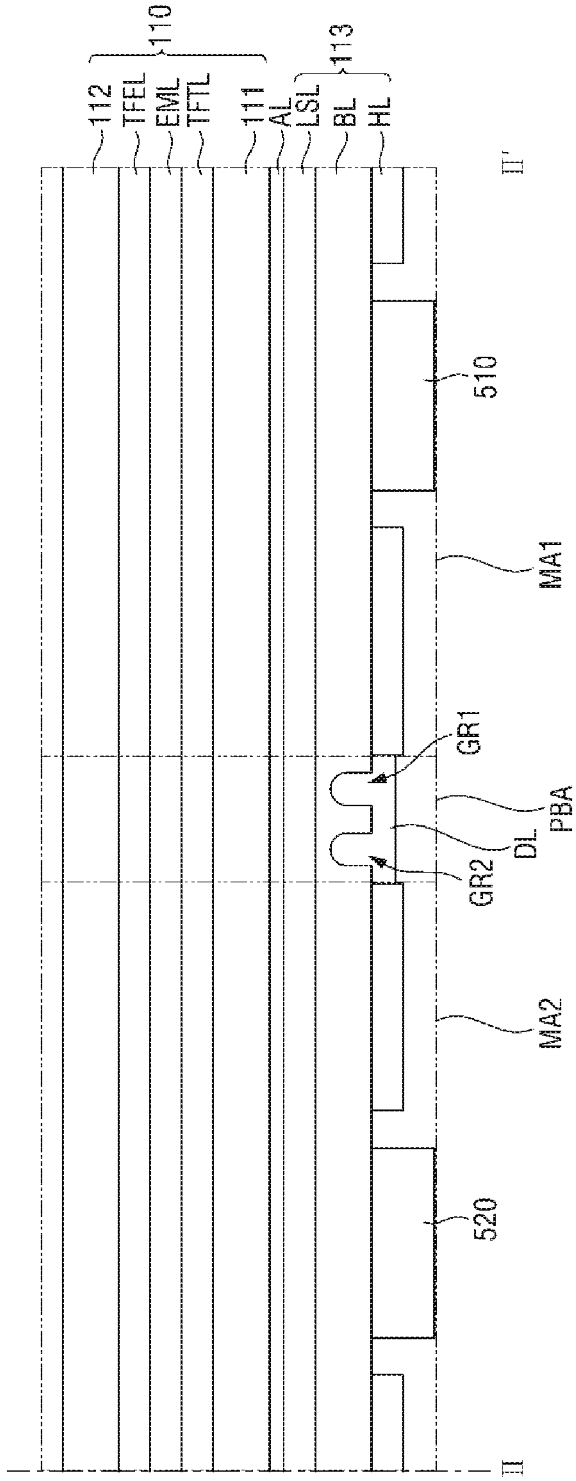
FIG. 27 is a cross-sectional view illustrating another example of III-III' of FIG. 25.

FIG. 27 is a cross-sectional view illustrating an example of III-III' of FIG. 25.

The embodiment illustrated in FIG. 27 differs from the embodiment illustrated in FIG. 26 in that a plurality of grooves GR1 and GR2 of a propagation blocking area PBA are filled with a low-density material DL. In FIG. 27, a description of elements and features identical to those of the embodiment illustrated in FIG. 26 will be omitted.

Referring to FIG. 27, the grooves GR1 and GR2 of the propagation blocking area PBA may be filled with the lower-density material DL having a lower density than a buffer member BL. The low-density material DL may be an organic material such as foam, polymer resin, or resin. In this case, since the density of a medium in the propagation blocking area PBA is lower than the density of a medium in a first main vibration area MA1 and the density of a medium in a second main vibration area MA2, it is possible to prevent vibrations generated by a first main sound generator 510 disposed in the first main vibration area MA1 from propagating through the buffer member BL. In addition, it is possible to prevent vibrations generated by a second main sound generator 520 disposed in the second main vibration area MA2 from propagating through the buffer member BL.

Figure 28:
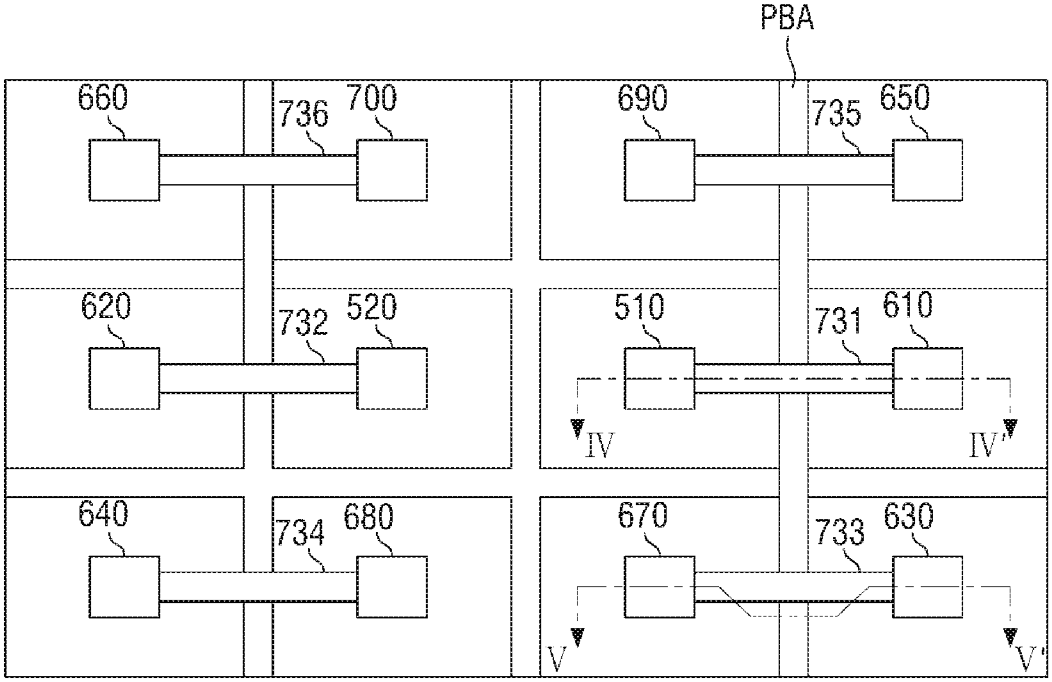
FIG. 28 is a bottom view illustrating an example of the display panel illustrated in FIG. 2.

FIG. 28 is a bottom view illustrating an example of the display panel 110 illustrated in FIG. 2. In FIG. 28, flexible films 122, a source circuit board 140, flexible cables 150, and a control circuit board 160 are omitted for ease of description.

The embodiment illustrated in FIG. 28 differs from the embodiment illustrated in FIG. 20 in that a plurality of grooves are formed in a propagation blocking area PBA, and first through sixth flexible circuit boards 731 through 736 cross the propagation blocking area PBA. In FIG. 28, a description of elements and features identical to those of the embodiment illustrated in FIG. 20 will be omitted.

As shown in FIG. 28, a plurality of grooves may be formed in the propagation blocking area PBA and may be filled with metal layers. A medium made discontinuous by the grooves of the propagation blocking area PBA can prevent vibrations generated by a sound generator in one vibration area from propagating to other vibration areas.

The metal layers filling the grooves may be electrically connected to a first main sound generator 510, a second main sound generator 520, and first through tenth sub-sound generators 610 through 700. In addition, the metal layers filling the grooves may be electrically connected to the control circuit board 160 by additional flexible circuit boards.

Specifically, the first through sixth flexible circuit boards 731 through 736 may be disposed to cross the propagation blocking area PBA. Each of the metal layers filling the grooves of the propagation blocking area PBA may be connected to any one of the first through sixth flexible circuit boards 731 through 736 in areas where the first through sixth flexible circuit boards 731 through 736 overlap the propagation blocking area PBA.

Figure 29:
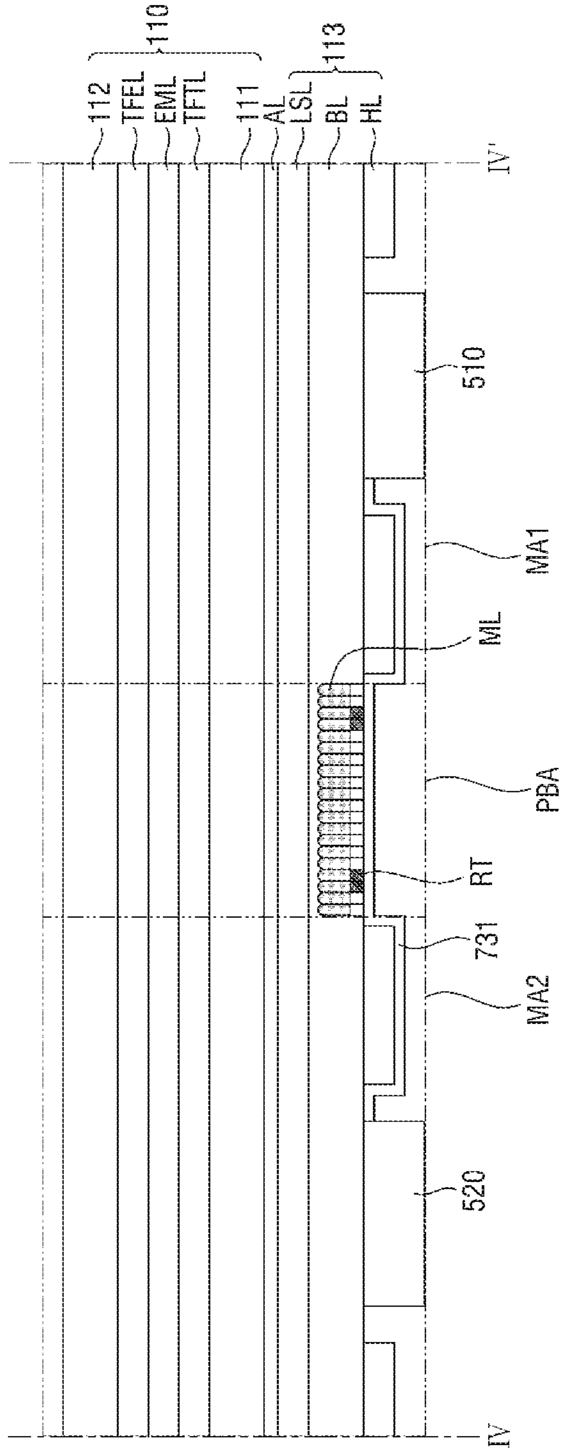
FIG. 29 is a cross-sectional view illustrating an example of IV-IV' of FIG. 28.

For example, lead terminals RT of the first flexible circuit board 731 may be connected to any four metal layers ML filling a plurality of grooves GR of the propagation blocking area PBA as illustrated in FIG. 29. In this case, lead terminals of the third flexible circuit board 733 may be connected to another four metal layers ML filling the grooves GR of the propagation blocking area PBA, and lead terminals of the fifth flexible circuit board 735 may be connected to another four metal layers ML filling the grooves GR of the propagation blocking area PBA.

In addition, lead terminals RT of the second flexible circuit board 732 may be connected to any four metal layers ML filling the grooves GR of the propagation blocking area PBA. In this case, lead terminals of the fourth flexible circuit board 734 may be connected to another four metal layers ML filling the grooves GR of the propagation blocking area PBA, and lead terminals of the sixth flexible circuit board 736 may be connected to another four metal layers ML filling the grooves GR of the propagation blocking area PBA.

Figure 30:
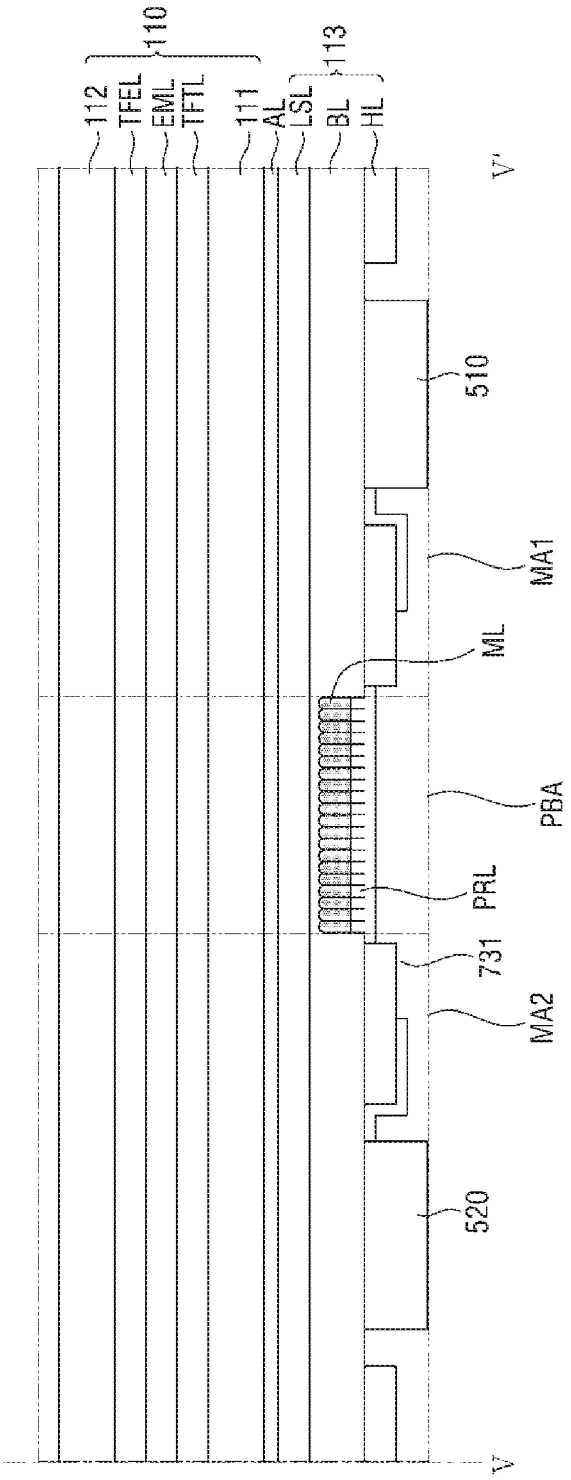
FIG. 30 is a cross-sectional view illustrating an example of V-V' of FIG. 28.

In addition, as illustrated in FIG. 30, a protective layer PRL may be disposed on the metal layers ML filling the grooves GR of the propagation area PBA in areas where the first through sixth flexible circuit boards 731 through 736 do not overlap the propagation blocking area PBA. The protective layer PRL may be an inorganic layer or an organic layer. Therefore, the metal layers ML filling the grooves GR of the propagation blocking area PBA can be prevented from being exposed to the outside in the areas where the first through sixth flexible circuit boards 731 through 736 do not overlap the propagation blocking area PBA.

Figure 31:
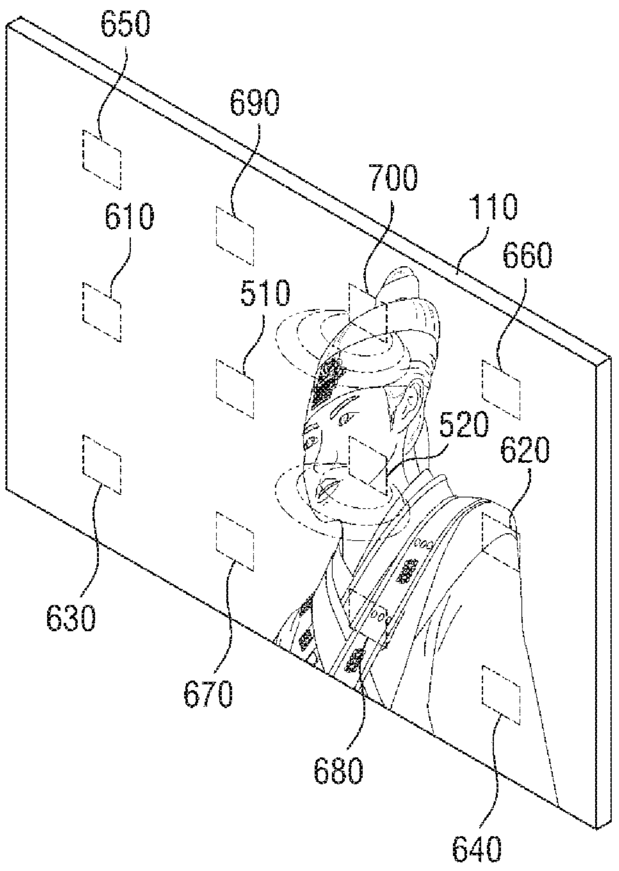
FIG. 31 illustrates the sound output of sound generators according to an image displayed on a display panel.

FIG. 31 is an exemplary view illustrating sound output from sound generators according to an image displayed on a display panel 110. In this example, the sound volume of at least one sound generator disposed adjacent to a speaker in an image displayed on the display panel 110 among a plurality of sound generators may be higher than those of other sound generators. For example, the sound volume of a first main sound generator 510 and the sound volume of a ninth sub-sound generator 690, which are disposed adjacent to the speaker among the sound generators, may be controlled to be higher than those of other sound generators. In this case, since the position of sound can be changed according to the position of the speaker in the image displayed on the display panel 110, a user can feel a sense of space in the image and sound provided by a display device 10. Therefore, the display device 10 can provide a more realistic and dynamic multimedia content (image associated with sound) to the user.

In various embodiments of display devices and methods of driving the same, a plurality of sound generators are disposed distributed across a rear surface of a display panel, and individual ones of the sound generators are selectively activated according to a sound directional mode. Therefore, sound can be output from a particular region of the display panel, and in a particular direction towards a viewer's location.

In addition, according to a display device and a method of driving the same according to an embodiment, since a propagation blocking area is disposed between adjacent vibration areas, vibrations generated by a sound generator in any one vibration area can be prevented from propagating to other vibration areas. Therefore, it is possible to prevent a sound generator in one vibration area from affecting the sound output of sound generators in other vibration areas.

Although example embodiments of the inventive concept have been disclosed for illustrative purposes, those skilled in the art will appreciate that various modifications, additions and substitutions are possible, without departing from the scope and spirit of the claimed subject matter as defined in the accompanying claims.

What is claimed is:

1. A display device comprising:

a display panel; and a first main sound generator and a first sub-sound generator disposed ea-below a surface of the display panel; and an under-panel member disposed between the surface of the display panel and the first main sound generator;

wherein a groove is defined in the under-panel member, and wherein the groove is disposed between the first main sound generator and the first sub-sound generator.

2. The display device of claim 1, wherein the groove fully surrounds the first main sound generator in plan view.

3. The display device of claim 1, wherein the first main sound generator and the first sub-sound generator are attached to the under-panel member.

4. The display device of claim 1, wherein the under-panel member comprises:

a light absorbing member disposed below the surface of the display panel;

a buffer member disposed below the light absorbing member; and a heat dissipating member disposed below the buffer member, wherein the first main sound generator and the first sub-sound generator do not overlap the heat dissipating member in a direction perpendicular to the surface of the display panel.

5. The display device of claim 4, wherein the first main sound generator and the first sub-sound generator overlap the light absorbing member and the buffer member in the direction perpendicular to the surface of the display panel.

6. The display device of claim 4, wherein the first main sound generator and the first sub-sound generator are attached to the buffer member.

7. The display device of claim 4, wherein the groove penetrates the heat dissipating member.

8. The display device of claim 7, wherein the groove further penetrates the buffer member.

9. The display device of claim 8, wherein the groove further penetrates the light absorbing member.

10. The display device of claim 1, wherein the display panel comprises:

a substrate;

a thin-film transistor layer disposed on the substrate; and a light emitting element layer disposed on the thin-film transistor layer, wherein the groove is further defined in the display panel, wherein the groove penetrates the under-panel member and the substrate of the display panel.

11. The display device of claim 10, wherein the groove further penetrates the thin-film transistor layer and the light emitting element layer.

12. The display device of claim 11, wherein the display panel further comprises an encapsulation layer disposed on the light emitting element layer, and wherein the groove further penetrates the encapsulation layer.

13. The display device of claim 1, further comprising:

a first circuit board connected to the first main sound generator and the first sub-sound generator;

wherein the first circuit board includes:

a first stem portion;

a first branch portion branched from the first stem portion and connected to the first main sound generator; and a second branch portion branched from the first stem portion and connected to the first sub-sound generator.

14. The display device of claim 1, further comprising:

a second main sound generator and a second sub-sound generator disposed below the surface of the display panel;

wherein the groove is further disposed between the second main sound generator and the second sub-sound generator.

15. The display device of claim 14, wherein the groove is further disposed between the first main sound generator and the second main sound generator.

16. The display device of claim 14, further comprising:

a second circuit board connected to the second main sound generator and the second sub-sound generator, wherein the second circuit board includes:

a second stem portion;

a fourth branch portion branched from the second stem portion and connected to the second main sound generator; and a fifth branch portion branched from the second stem portion and connected to the second sub-sound generator.

17. A display device comprising:

a display panel;

a first main sound generator and a first sub-sound generator disposed below a surface of the display panel;

an under-panel member disposed between the surface of the display panel and the first main sound generator; and a filling material;

wherein a groove is defined in the under-panel member, wherein the filling material fills the groove, and wherein the filling material is disposed between the first main sound generator and the first sub-sound generator.

18. The display device of claim 17, wherein the under-panel member comprises:

a buffer member disposed below a light absorbing member; and a heat dissipating member disposed below the buffer member, wherein the first main sound generator and the first sub-sound generator do not overlap the heat dissipating member in a direction perpendicular to the surface of the display panel, and wherein the groove is defined in the buffer member.

19. The display device of claim 18, wherein the groove does not overlap the heat dissipating member in the direction perpendicular to the surface of the display panel.

20. The display device of claim 18, wherein a density of the filling material is lower than a density of the buffer member.

21. The display device of claim 20, wherein the groove is disposed between the first main sound generator and the first sub-sound generator.

22. The display device of claim 21, wherein the groove is provided in a plural, and wherein at least two grooves are disposed between the first main sound generator and the first sub-sound generator.

* * * * *